United States Patent
Kawaguchi

(10) Patent No.: US 9,513,810 B2
(45) Date of Patent: Dec. 6, 2016

(54) FAST ACCESSIBLE COMPRESSED THIN PROVISIONING VOLUME

(71) Applicant: HITACHI, LTD., Tokyo (JP)

(72) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/536,771

(22) Filed: Nov. 10, 2014

(65) Prior Publication Data

US 2015/0067257 A1 Mar. 5, 2015

Related U.S. Application Data

(63) Continuation of application No. 13/234,078, filed on Sep. 15, 2011, now Pat. No. 8,898,384, which is a continuation of application No. 11/948,948, filed on Nov. 30, 2007, now Pat. No. 8,131,927.

(51) Int. Cl.
  *G06F 3/06* (2006.01)
  *G06F 12/08* (2016.01)

(52) U.S. Cl.
  CPC ............ *G06F 3/0608* (2013.01); *G06F 3/0656* (2013.01); *G06F 3/0665* (2013.01); *G06F 3/0689* (2013.01); *G06F 12/0866* (2013.01)

(58) Field of Classification Search
  CPC .. G06F 3/0608; G06F 3/0665; G06F 3/0689; G06F 3/0656; G06F 12/0866
  See application file for complete search history.

(56) References Cited

U.S. PATENT DOCUMENTS

| | | | |
|---|---|---|---|
| 5,247,638 A * | 9/1993 | O'Brien et al. | ................ 710/68 |
| 6,145,069 A | 11/2000 | Dye | |
| 6,320,521 B1 | 11/2001 | Har et al. | |
| 7,130,960 B1 * | 10/2006 | Kano | ............................ 711/112 |
| 7,543,129 B2 | 6/2009 | Kato et al. | |
| 7,747,799 B2 | 6/2010 | Nakagawa et al. | |
| 7,822,939 B1 | 10/2010 | Veprinsky et al. | |
| 2006/0004968 A1 * | 1/2006 | Vogt | ............................. 711/154 |
| 2006/0242431 A1 | 10/2006 | LeCrone et al. | |
| 2006/0256466 A1 | 11/2006 | Katagiri et al. | |

FOREIGN PATENT DOCUMENTS

WO 2005/017737 A2 2/2005

OTHER PUBLICATIONS

LTO (Linear Tape-Open): One of the standard format of tape media http://www.lto-technology.com/newsite/index.html, Nov. 30, 2007.
Microsoft® Windows® NTFS: Supports file level compression, "Local File Systems for Windows" http://www.microsoft.com/whdc/device/storage/LocFileSys.mspx, May 5, 2004.

* cited by examiner

*Primary Examiner* — Michael Alsip
(74) *Attorney, Agent, or Firm* — Mattingly & Malur, P.C.

(57) ABSTRACT

A computerized data storage system includes at least one storage device including a nonvolatile writable medium; a cache memory and a data management controller and a storage port. The storage port is operable to receive a request to read data, and, in response to the request to read data, to send the data stored in the data storing area of the cache memory. The storage port is further operable to receive a request to write data, and, in response to the request to write data, to send the write data to the data storing area of the cache memory. The storage system further includes a thin provisioning controller operable to provide a virtual volume, and a capacity pool. The storage system further includes a data compression controller and a data decompression controller.

18 Claims, 31 Drawing Sheets

| 112-11-01 | 112-11-02 | 112-11-03 | 112-11-04 |
|---|---|---|---|
| RAID Gr.# | RAID Lv. | HDD# | HDD Capacity |
| 0 | 5 | 0,1,2,3 | 40GB |
| 1 | 6 | 4,5,6,7,8,9,10,11 | 100GB |
| 2 | 10 | 12,13,14,15 | 100GB |
| 3 | N/A | N/A | N/A |
| 4 | 10 | 32,33,34,35 | 20GB |
| 5 | 10 | 40,41,42,43 | 300GB |
| 6 | 5 | 64,65,66,67 | 40GB |

| Volume# | Capacity | Capacity Pool# | Volume Type | Using RAID Gr. & Chunk# |
|---|---|---|---|---|
| 0 | 0GB | N/A | N/A | N/A |
| 1 | 500GB | 2 | Compressed | 3 / 3 |
| 2 | 300GB | 1 | Compressed & Encrypted | 1 / 19 |
| 3 | 0GB | N/A | N/A | N/A |
| 4 | 500GB | 2 | Encrypted | 3 / 21 |
| 5 | 0GB | N/A | N/A | N/A |
| 6 | 1000GB | 1 | Thin Provisioning | 1 / 16 |

Columns: 112-12-01, 112-12-02, 112-12-03, 112-12-04, 112-12-05

| 112-13-01 | 112-13-02 | 112-13-03 | 112-13-04 |
|---|---|---|---|
| Top LBA Addr. of Virtual Vol. Page | RAID Gr.# | Top LBA Addr. of Capacity Pool Page | Allocated Capacity Pool Page Size |
| 0x0000 | 10 | 0x4000 | 1024kB |
| 0x0100 | 14 | 0x0200 | 256kB |
| 0x0200 | 18 | 0x0000 | 3840kB |
| 0x0300 | N/A | N/A | N/A |
| 0x0400 | 10 | 0x3200 | 768kB |
| 0x0500 | 18 | 0x0200 | 256kB |
| 0x0600 | 10 | 0x1000 | 4096kB |

| 112-14-01 | 112-14-02 | 112-14-03 |
| --- | --- | --- |
| Capacity Pool# | RAID Gr. List | Free Capacity |
| 0 | 1, 3, 5, 10, 12, 14 | 10MB |
| 1 | 6, 8, 11 | 20MB |
| 2 | N/A | N/A |

| 112-15-01 | 112-15-02 | 112-15-03 | 112-15-04 |
| --- | --- | --- | --- |
| RAID Gr.# | Capacity Pool# | Free Chunk Queue Index | Used Chunk Queue Index |
| 10 | 0 | 8 | 8 |
| 11 | 1 | 15 | 15 |
| 12 | 0 | 3 | 3 |
| 13 | N/A | Null | Null |
| 14 | 0 | 31 | 31 |

| 112-16-01 | 112-16-02 | 112-16-03 | 112-16-04 | 112-16-04 |
|---|---|---|---|---|
| Chunk# | Virtual Volume# | Used Capacity | Deleted Capacity | Next Chunk Pointer |
| 0 | 2 | 0 | 0kB | 2 |
| 1 | 10 | 2048kB | 1024kB | 3 |
| 2 | 5 | 8192kB | 768kB | 1 |
| 3 | 7 | 4096kB | 0kB | Null |
| 4 | N/A | 0 | 0 | 31 |

| 112-18-01 | 112-18-02 | 112-18-03 | 112-18-04 |
|---|---|---|---|
| Index | HDD# or LUN | LBA | Next |
| 0 | 2 | 0xA00 | 1 |
| 1 | 1 | 0x7E000 | 2 |
| 2 | 1 | 0x9700 | 3 |
| 3 | 0 | 0x0000 | NULL |
| 4 | 2 | 0xC500 | 5 |
| 5 | 1 | 0x1100 | 6 |
| 6 | 1 | 0xFF00 | NULL |

| 112-18-11 | 112-18-12 |
|---|---|
| Kind of Queue | Pointer |
| Free | 2 |
| Clean | 1 |
| Dirty | 4 |

FAST ACCESSIBLE COMPRESSED THIN PROVISIONING VOLUME

CROSS-REFERENCES TO RELATED PATENT APPLICATIONS

This is a continuation application of application Ser. No. 13/234,078, Sep. 15, 2011, which is a continuation application of application Ser. No. 11/948,948, filed Nov. 30, 2007, (now U.S. Pat. No. 8,131,927), the entire disclosures of all applications listed above are hereby incorporated by reference.

FIELD OF THE INVENTION

The present invention generally relates to storage technology and more specifically to storage systems incorporating one or more compressed data volumes.

DESCRIPTION OF THE RELATED ART

Generally, it is desirable for a storage system to reduce waste of storage space on storing unnecessary and/or redundant information thereby reducing the size of the stored data. Storing only the necessary information increases the storage capacity available for storing important data thereby reducing overall storage costs. In the past, a number of approaches for reducing the size of the stored data have been developed.

One such solution includes a filesystem which is designed to automatically compress the data files that it manages. This approach is widely used in the art, for example "Microsoft® Windows® NTFS". While this approach is very effective, it has one critical limitation, wherein the files compressed by one filesystem cannot be used in other filesystems because of differences in implementation of different filesystems.

Another solution is "thin provisioning", which is disclosed in U.S. Pat. No. 7,130,960, incorporated herein by reference in its entirety. The aforesaid thin provisioning technique also reduces the waste data by preventing allocation of any storage capacity to unwritten data area. This technology is applied at the block device level such that the implementation of thin provisioning is fully transparent to the filesystem. However, in many cases, thin provisioning volumes incorporate data areas filled with "0" data near the storage areas filled with useful information. Such "0"-filled data areas constitute a waste of storage capacity in the storage system.

On the other hand, low-level storage devices, such as tape drives, often incorporate a compression function. For example, a tape storage device can compress data when it transfers volume data stored in hard disk drives (HDDs) to a tape medium. But the aforesaid compression based volume data transfer is problematic when a part of the transferred data needs to be modified. To modify a part of the compressed volume data, one must first decompress the entire data volume, including unchanged data, then modify the necessary parts thereof and, finally, re-compress the entire volume again. This is because the compressed data cannot be modified directly without recompression. The aforesaid steps take long time to perform, preventing the transactional use of the data volume during the lengthy compression process. Systems using HDDs instead of tape devices suffer from the same problem as the tape medium.

Thus, the existing storage technology is deficient in its ability to effectively reduce the size of the stored data using compression and/or thin provisioning.

SUMMARY OF THE INVENTION

The inventive methodology is directed to methods and systems that substantially obviate one or more of the above and other problems associated with conventional techniques involving thin provisioning and data compression.

In accordance with one aspect of the inventive concept, there is provided a computerized data storage system. The inventive system incorporates at least one storage device having a nonvolatile writable medium; a cache memory operatively coupled to the storage port and having a data storing area and a data management controller; and a storage port. The storage port is configured to connect to a host computer and receive and send I/O information required by the host computer. The storage port is configured to receive requests to read and write data, and, in response to the request to read data, the storage port is configured to send the data stored in the data storing area of the cache memory and in response to a request to write data, the storage port is configured to send the write data to the data storing area of the cache memory. The inventive system further includes a thin provisioning controller configured to provide a virtual volume having a virtual volume page, a capacity pool having a capacity pool page and manage a mapping between the virtual volume page and the capacity pool page. The inventive system yet further includes a data compression controller configured to perform a compression operation on the virtual volume page, and a data decompression controller configured to perform a decompression operation on the virtual volume page.

In accordance with another aspect of the inventive concept, there is provided a method to be performed by a computerized data storage system. The inventive method involves: providing a virtual volume having a virtual volume page; providing a capacity pool having a capacity pool page; managing a mapping between the virtual volume page and the capacity pool page; providing a data caching area storing data; receiving a request to read data from a host computer, and, in response to the request to read data, sending to the host computer the data stored in the data caching area; receiving a request to write data from the host computer, and, in response to the request to write data, writing the write data provided by the host computer to the data caching area; performing a compression operation on the virtual volume page, and performing a decompression operation on the virtual volume page.

In accordance with yet another aspect of the inventive concept, there is provided a computer-readable medium embodying a set of instructions. The aforesaid set of instructions, when executed by a storage system comprising one or more processors, causes the storage system to: provide a virtual volume, the virtual volume comprising a virtual volume page; provide a capacity pool comprising a capacity pool page; manage a mapping between the virtual volume page and the capacity pool page; provide a data caching area storing data; receive a request to read data from a host computer, and, in response to the request to read data, send to the host computer the data stored in the data caching area; receive a request to write data from the host computer, and, in response to the request to write data, write the write data provided by the host computer to the data caching area; perform a compression operation on the virtual volume page, and perform a decompression operation on the virtual volume page.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 8 illustrates an exemplary embodiment of a RAID Group Management Table.

FIG. 9 illustrates an exemplary embodiment of a Virtual Volume Management Table.

FIG. 10 illustrates an exemplary embodiment of a Virtual Volume Page Management Table.

FIG. 11 illustrates an exemplary embodiment of a Capacity Pool Management Table.

FIG. 12 illustrates an exemplary embodiment of a Capacity Pool Element Management Table.

FIG. 13 illustrates an exemplary embodiment of a Capacity Pool Chunk Management Table.

FIG. 15 illustrates an exemplary embodiment of a Cache Management Table.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Storage System Components

Figure 1:
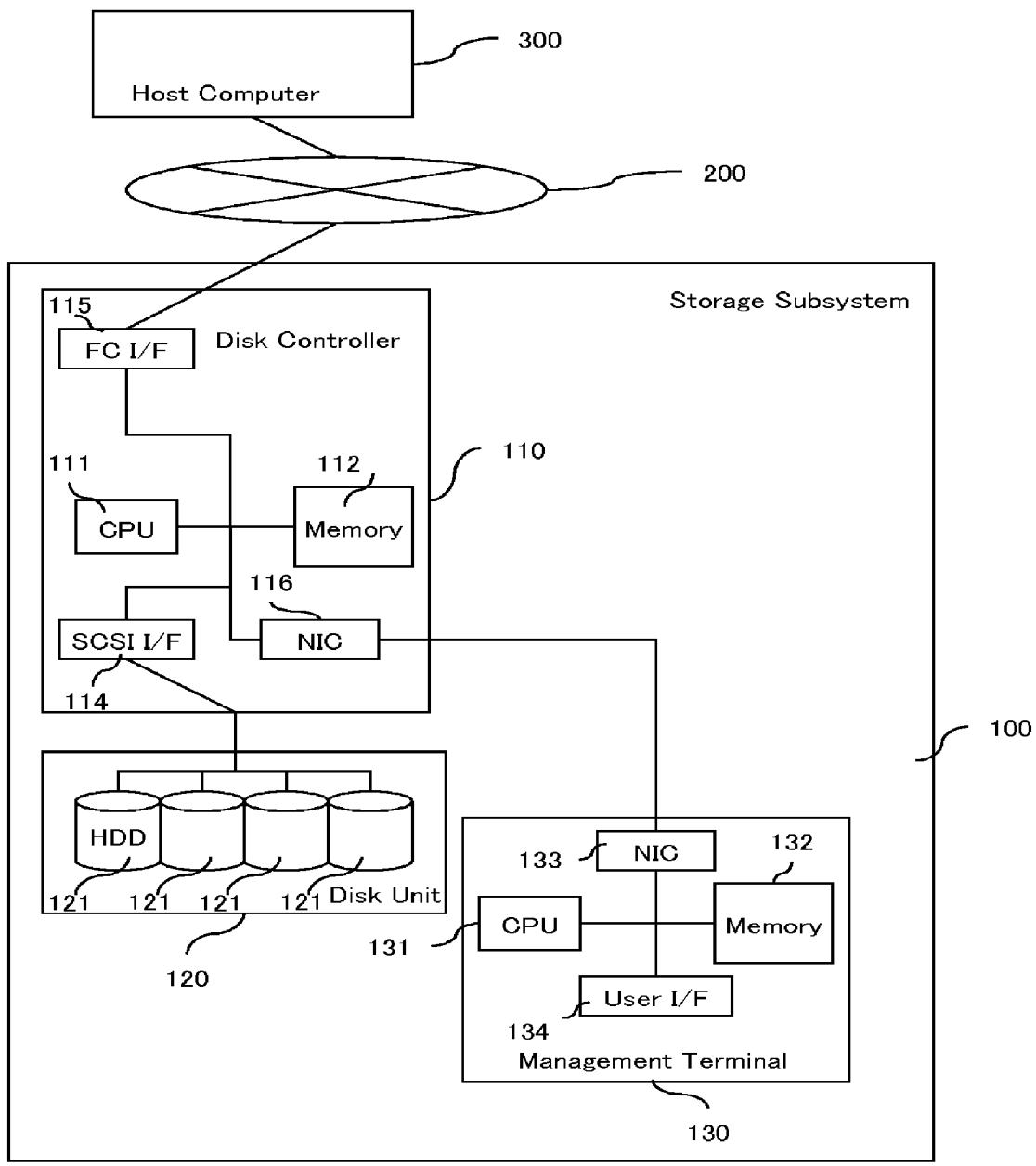
FIG. 1 illustrates an exemplary system architecture of an embodiment of the inventive storage system

FIG. 1 illustrates an exemplary system architecture of an embodiment of the inventive storage system. With reference to FIG. 1, an exemplary embodiment of a storage system consistent with principles of the inventive approach incorporates Storage Subsystem 100, Storage Network 200 and Host Computer 300. In one implementation, the Storage Subsystem 100 includes Storage Controller 110, Disk Unit 120 and Management Terminal 130. In one embodiment, the aforesaid Storage Controller 110 incorporates a CPU 111, which executes various software programs. The programs and data tables used by the CPU 111 are stored in the Memory 112 of the Controller 110. In one embodiment, the controller 110 further incorporates a Disk Interface 114, which may be implemented as a SCSI interface. The Disk Interface 114 operates to connect Disk 120 to the Controller 110. The controller 110 also incorporates Host Interface 115, which may be implemented as a FibreChannel interface.

The Host Interface 115 operates to interconnect the Controller 110 with the Host Computer 300 via the Storage Network 200. The Host Interface 115 receives I/O requests from the Host Computer 300 and provides the corresponding information to the CPU 111. In one implementation, the Disk Controller 110 further incorporates Management Terminal Interface (e.g. NIC I/F) 116. The Management Terminal Interface 116 connects the Disk Controller 110 with the Storage Controller Interface 133. The aforesaid Management Terminal Interface 116 receives volume, disk and capacity pool operation requests from Management Terminal 130 and inform to CPU 111.

The Disk Unit 120 incorporates one or more Disks 121, which may be HDDs. The Management Terminal 130 may include a CPU 131, which operates to manage various processes of the Management Terminal 130, a Memory 132 and a Storage Controller Interface (NIC) 133. The Storage Controller Interface 133 is connected to Management Terminal Interface 116 of the Disk Controller 110. The Storage Controller Interface 133 sends information on the volume, disk and capacity pool operations to Storage Controller 110. In one embodiment, the Management Terminal 130 further includes a User Interface 134, which may be a Keyboard, Mouse, Monitor or the like devices.

Figure 2:
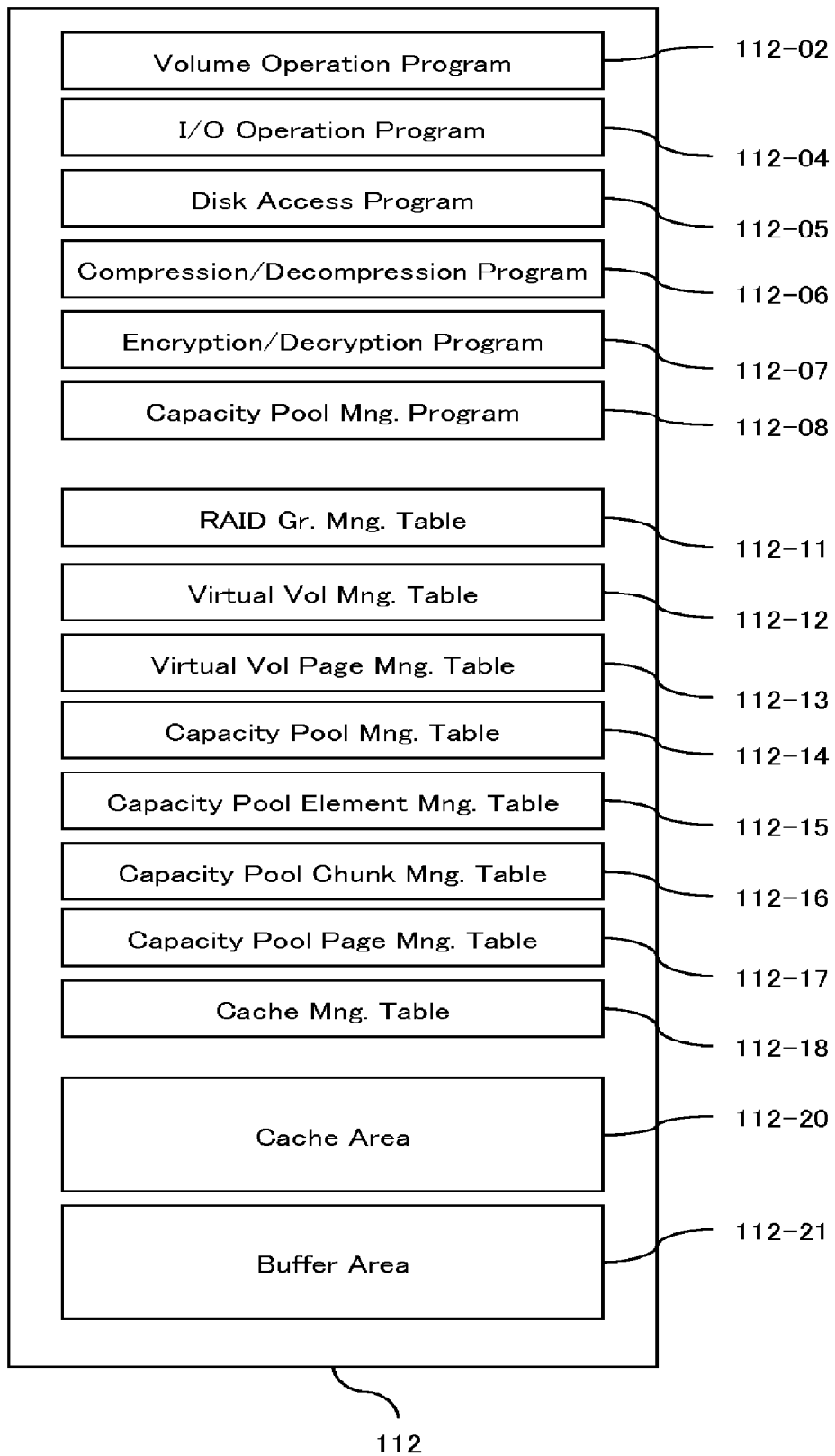
FIG. 2 illustrates an exemplary structure of the information stored in the Memory.
Figure 3:
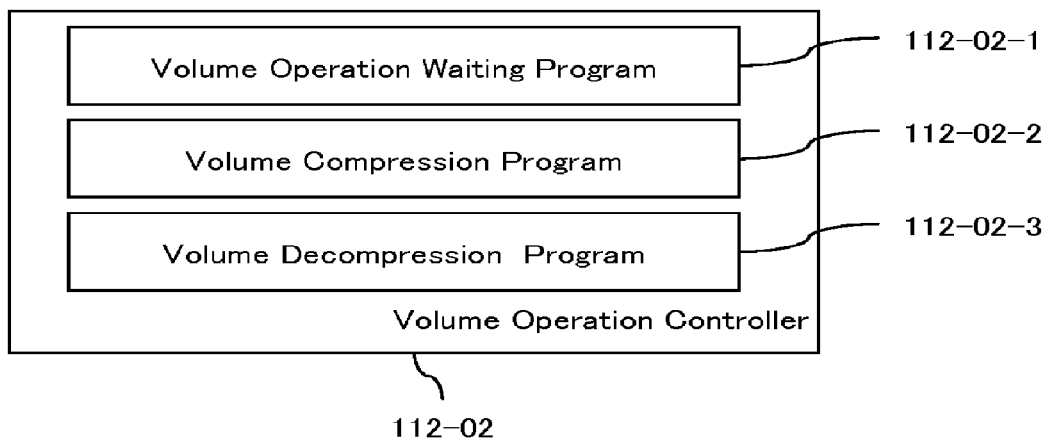
FIG. 3 illustrates an exemplary embodiment of a Volume Operation Program.

FIG. 2 illustrates an exemplary structure of the information stored in the Memory 112. In one implementation, the Memory 112 stores a Volume Operation Program 112-02. The Volume Operation Program 112-02 includes a Volume Operation Waiting Program 112-02-1, Volume Compression Program 112-02-2 and Volume Decompression Program 112-02-3, illustrated in FIG. 3. The Volume Operation Waiting Program 112-02-1 executes when the CPU 111 receives a volume compression or decompression request. This program may be implemented as a system residence program. The Volume Compression Program 112-02-2 executes when the CPU 111 received a volume compression request. The Volume Compression Program 112-02-2 changes a thin provisioning volume to a compression volume using compression. The Volume Compression Program 112-02-2 is called by Volume Operation Waiting Program 112-02-1.

The Volume Decompression Program 112-02-3 executes when the CPU 111 receives a volume decompression request. The Volume Decompression Program 112-02-3 changes a compression volume to a thin provisioning (decompression) volume using decompression. The Volume Operation Program 112-02-3 is called by Volume Operation Waiting Program 112-02-1.

Figure 4:
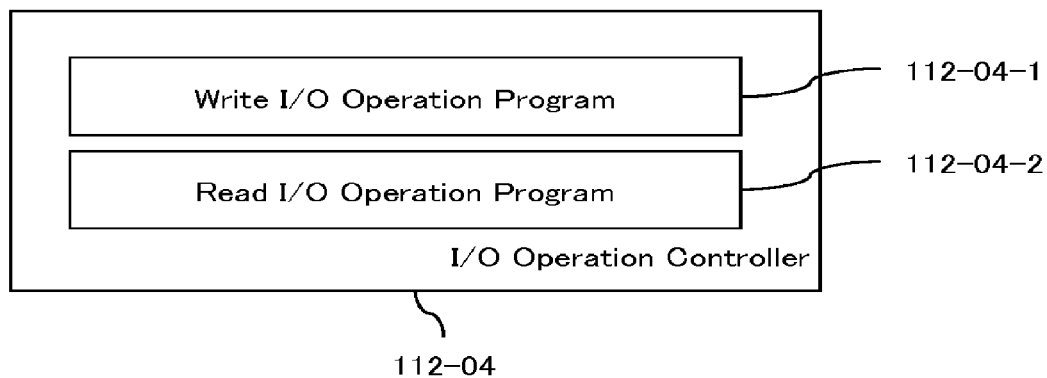
FIG. 4 illustrates an exemplary embodiment of an I/O Operation Program.

In one exemplary implementation, the Memory 112 further stores an I/O Operation Program 112-04. The I/O Operation Program 112-04 consists of a Write I/O Operation Program 112-04-1 and a Read I/O Operation Program 112-04-2, illustrated in FIG. 4. The Write I/O Operation Program 112-04-1 executes when the CPU 111 receives a write I/O request. The Write I/O Operation Program 112-04-1 transfers I/O data from the Host Computer 300 to the Cache Area 112-20 via the Host interface 115. This program 112-04-1 may be implemented as a system residence program.

The Read I/O Operation Program 112-04-2 is executed when the CPU 111 receives a read I/O request. The Read I/O Operation Program 112-04-2 operates to transfer I/O data from the Cache Area 112-20 to the Host Computer 300. The Read I/O Operation Program 112-04-2 may also be implemented as a system residence program.

Figure 5:
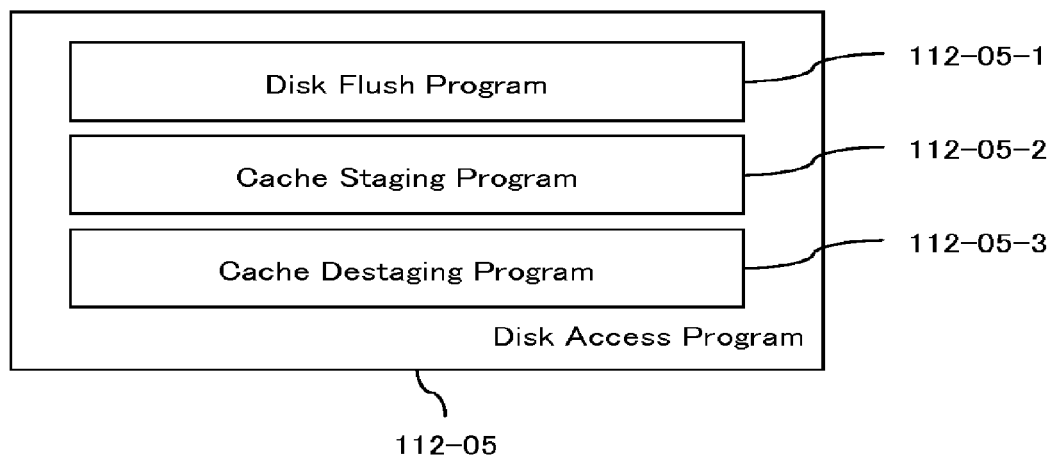
FIG. 5 illustrates an exemplary embodiment of a Disk Access Program.

In one exemplary implementation, the Memory 112 may also store a Disk Access Program 112-05. The Disk Access Program 112-05 includes a Disk Flushing Program 112-05-1, Cache Staging Program 112-05-2 and a Cache Destaging Program 112-05-1, illustrated in FIG. 5. The Disk Flushing Program 112-05-1 searches for dirty cache data and flushes it to Disk 121. The Disk Flushing Program 112-05-1 is executed when the workload of the CPU 111 is relatively low. The Disk Flushing Program 112-05-1 may also be implemented as a system residence program.

The Cache Staging Program 112-05-2 operates to transfer data from Disk 121 to Cache Area 112-05-20. The Cache Staging Program 112-05-2 is executed when the CPU 111 needs to access the data in the Disk 121. The Cache Destaging Program 112-05-3 transfers data from the Cache Area. The Cache Destaging Program 112-05-2 is executed when the Disk Flushing Program 112-05-1 flushes dirty cache data to the Disk 121.

Figure 6:
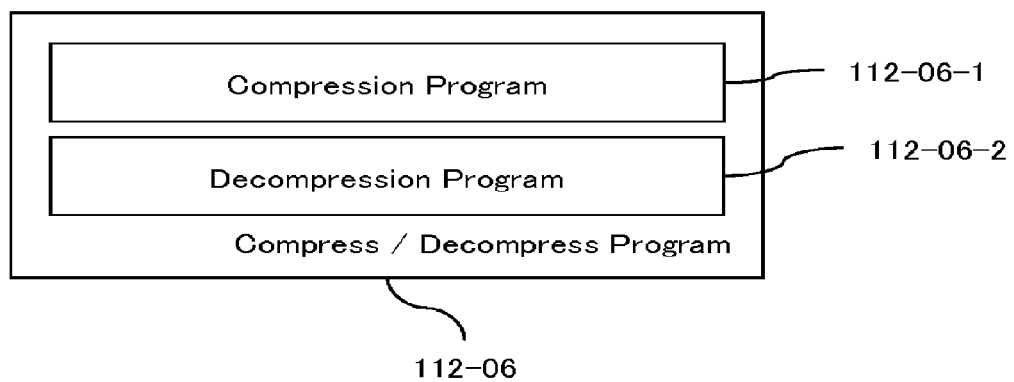
FIG. 6 illustrates an exemplary embodiment of a Compression/Decompression Program.

In one exemplary implementation, the Memory 112 further stores Compression/Decompression Program 112-06. The Compression/Decompression Program 112-06 includes a Compression Program 112-06-1 and Decompression Program 112-06-2, illustrated in FIG. 6. The Compression Program 112-06-1 operates to compress data in the Cache Area 112-20. The Compression Program 112-06-1 uses the Buffer Area 112-21 to temporarily store the compressed data. The Compression Program 112-06-1 is executed upon a call from the Cache Destaging Program 112-05-2, when there is data that needs to be compressed. The Decompression Program 112-06-2 decompresses data in the Cache Area 112-20 and uses Buffer Area 112-21 to temporarily store the decompressed data. The Decompression Program 112-06-2 is executed upon a call from the Cache Staging Program 112-05-1, when there is data that needs to be decompressed.

Figure 7:
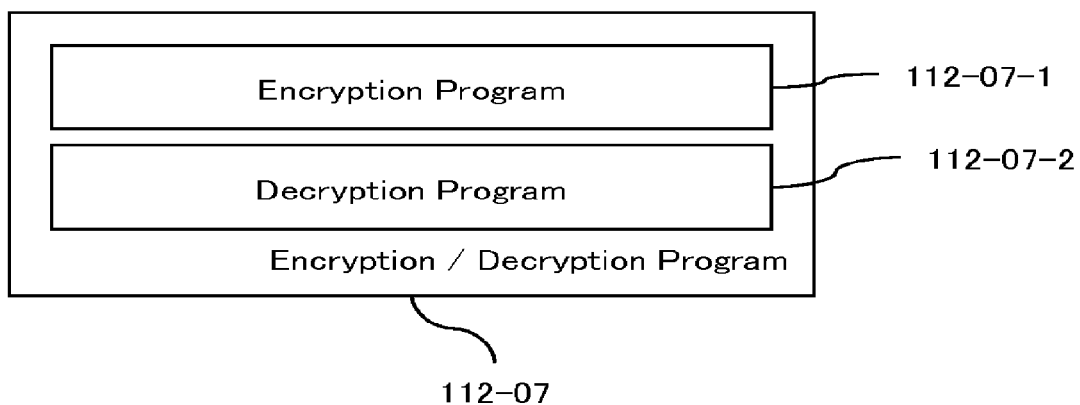
FIG. 7 illustrates an exemplary embodiment of an Encryption/Decryption Program.

In one exemplary embodiment, the Memory 112 may further store an Encryption/Decryption Program 112-07. In one implementation, the Encryption/Decryption Program 112-07 includes Encryption Program 112-07-1 and Decryption Program 112-07-2, illustrated in FIG. 7. The Encryption Program 112-07-1 encrypts data in the Cache Area 112-20. This program uses Buffer Area 112-21 to temporarily store the encrypted data. The Encryption Program 112-07-1 is executed upon a call from the Cache Destaging Program 112-05-2, when there is data that needs to be encrypted.

When both Encryption Program 112-07-1 and Compression Program 112-06-1 are sequentially executed on the same data set, the Compression Program 112-06-1 is executed first and the Encryption Program 112-07-1 is executed second. The Decryption Program 112-07-2 decrypts data in the Cache Area 112-20. This program uses Buffer Area 112-21 to temporarily store the decompressed data. The Decryption Program 112-07-2 is executed upon a call from the Cache Staging Program 112-05-1, when there is data that needs to be decrypted. When both Decryption Program 112-07-2 and Decompression Program 112-06-2 are sequentially executed on the same dataset, the Decryption Program 112-07-2 is executed first and the Decompression Program 112-06-2 is executed second.

In one exemplary embodiment, the Memory 112 may further store a Capacity Pool Management Program 112-08. The Capacity Pool Management Program 112-08 does garbage collection in capacity pools. The Capacity Pool Management Program 112-03 is executed when the workload of the CPU 111 is relatively low or the remaining capacity of the capacity pool is low. This program may be implemented as a system residence program.

In one exemplary embodiment, the Memory 112 may further store a RAID Group Management Table 112-11. The aforesaid RAID Group Management Table 112-11 is illustrated in FIG. 8 and may include a RAID Group Number Information column 112-11-01 representing an ID of RAID group in Storage Controller 110 as well as RAID Level Information column 112-11-02. The information in the RAID Level Information column 112-11-02 carries information on the RAID level as well as RAID organization Information. The value of "10" in this column means "Mirroring and Striping", the value "5" means "Parity Striping", while the value "6" means "Double Parity Striping." The value "N/A" means that the corresponding RAID group doesn't exist.

The RAID Group Management Table 112-11 may further include HDD Number Information column 112-11-03. This column stores ID list of Disks 121 grouped in the corresponding RAID group. The RAID Group Management Table 112-11 may further include HDD Capacity Information column 112-11-04, storing information on minimum capacity of the Disk 121 of the corresponding RAID group.

The Memory 112 may further store a Virtual Volume Management Table 112-12. The Virtual Volume Management Table 112-12 is illustrated in FIG. 9 and may include a Volume Number Information column 112-12-01 storing ID of the corresponding virtual volume in Storage Controller 110. The table 112-12 may further include a Volume Capacity Information column 112-12-02 storing the information on the capacity of the respective virtual volume. The table 112-12 may further include a Capacity Pool Number Information column 112-12-03 storing a Capacity Pool Number corresponding to the respective virtual volume. Each virtual volume is allocated data storage capacity from this capacity pool. The table 112-12 may further incorporate the Volume Type Information column 112-12-04 storing virtual volume type information. The value "Thin Provisioning" in this column means that the virtual volume is a normal thin provisioning volume. "Compressed" means that the corresponding virtual volume is a thin provisioning volume having compressed pages. "Encrypted" means that the corresponding virtual volume is a thin provisioning volume having encrypted pages. "Compressed & Encrypted" means that the corresponding virtual volume is a thin provisioning volume having pages that are compressed and encrypted. Finally, "N/A" means that the corresponding virtual volume doesn't exist.

The aforesaid table 112-12 may further include Current Using Chunk Information column 112-12-05 storing information on chunks that the virtual volume has received from the respective capacity pool specified in the Capacity Pool Number Information column 112-12-03. As one of ordinary skill in the art would appreciate, each virtual volume receives capacity pool pages from the pool chunk.

In one implementation, the Memory 112 also stores Virtual Volume Page Management Table 112-13. The Virtual Volume Page Management Table 112-13 is illustrated in FIG. 10 and may include a Virtual Volume Page Address column 112-13-01 specifying ID of the virtual volume page in the corresponding virtual volume. The table 112-13 may further include Related RAID Group Number column 112-13-02 specifying the RAID group number of the allocated capacity pool page. The value "N/A" in this column indicates that the virtual volume page doesn't allocate a capacity pool page.

The table 112-13 may further include a Capacity Pool Page Address column 112-13-03 storing a Logical address of the corresponding capacity pool page. And in particular the start address of the capacity pool page. The table 112-13 may further include Capacity Pool Page Size column 112-13-04 storing information on the size of the corresponding capacity pool page. If the capacity pool size is the same as the default size, it indicates that the virtual volume page isn't compressed.

In one implementation, the Memory 112 also stores Capacity Pool Management Table 112-14. The Capacity Pool Management Table 112-14 is illustrated in FIG. 11 and may include a Capacity Pool Number column 112-14-01 storing ID of the capacity pool in the Storage Controller 110. The table 112-14 may further include a RAID Group List column 112-14-02 storing a list of RAID groups that are included into the capacity pool. The value "N/A" in this column means that the respective capacity pool doesn't exist. The table 112-14 may further include a Free Capacity Information column 112-14-03 storing information on storage capacity of the entire free area in the capacity pool.

In one implementation, the Memory 112 also stores a Capacity Pool Element Management Table 112-15. The Capacity Pool Element Management Table 112-15 is illustrated in FIG. 12 and may include a RAID Group Number column 112-15-01 storing an ID of the corresponding RAID group in the Storage Controller 110. The table 112-15 may further include a Capacity Pool Number column 112-15-02 storing the ID of the Capacity pool that the corresponding RAID Group belongs to.

The table 112-15 may further include a Free Chunk Queue Index column 112-15-03 storing the Free chunk queue index number. In an embodiment of the inventive storage system, the RAID Group manages the free chunks as a queue. The table 112-15 may further include a Used Chunk Queue Index column 112-15-04 storing used chunk queue index number. In one embodiment of the inventive storage system, the RAID Group manages the used chunks as a queue.

In one implementation, the Memory 112 also stores Capacity Pool Chunk Management Table 112-16. The Capacity Pool Chunk Management Table 112-16 is illustrated in FIG. 13 and includes a Chunk Number column 112-16-01 storing an ID of the chunk in the RAID group. The table 112-16 may further include a Virtual Volume Number column 112-16-02 storing the number of the virtual volume that uses the capacity pool chunk.

The table 112-16 may further include a Used Capacity Information column 112-16-03 storing information on total used capacity of the capacity pool chunk. When a virtual volume gets a capacity pool page from the capacity pool chunk, this parameter is increased by the capacity pool page size.

The table 112-16 may further include a Deleted Capacity Information column 112-16-04 storing information on total deleted capacity from the capacity pool chunk. When a virtual volume releases a capacity pool page by volume format or virtual volume page reallocation, this parameter is increased by the capacity of the pool page size.

The table 112-16 may further include a Next Chunk Pointer column 112-16-05 storing a Pointer of the other capacity pool chunk. In an embodiment of the inventive storage system, the capacity pool chunks have a queue structure. The values in the Free Chunk Queue Index column 112-15-03 and Used Chunk Queue Index column 112-15-04 are the indexes of the aforesaid queue.

In one implementation of the invention, the Memory 112 also stores Capacity Pool Page Management Table 112-17.

Figure 14:
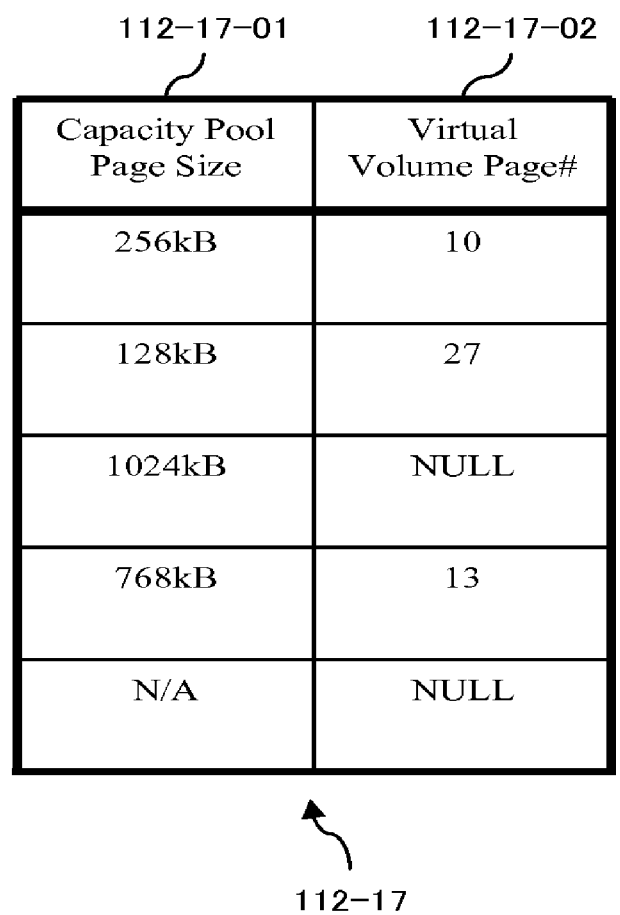
FIG. 14 illustrates an exemplary embodiment of a Capacity Pool Page Management Table.

The Capacity Pool Page Management Table 112-17 is illustrated in FIG. 14 and includes a Capacity Pool Page Size column 112-17-01 storing information on the size of the corresponding capacity pool page. This parameter is stored when the capacity page is allocated to the virtual volume page. The value "N/A" in this column indicates the end of the capacity pool page list. The total size that the value in the Capacity Pool Page Size column 112-17-01 represents equals to sum of allocated and deleted size that is written in Used Capacity Information column 112-16-03 and Deleted Capacity Information column 112-16-04.

The table 112-17 may further include a Virtual Volume Page Number column 112-17-02 storing virtual volume page number that corresponds to the capacity pool page. The value "NULL" in this column indicates a deleted page, when the value in the Capacity Pool Page Size column 112-17-01 is not "N/A".

In one implementation of the invention, the Memory 112 also stores Cache Management Table 112-18. The Cache Management Table 112-18 is illustrated in FIG. 15 and includes a Cache Slot Number column 112-18-01 storing the ID of the cache slot in Cache Area 112-20. In one implementation of the invention, the Memory 112 includes a Cache Area 112-20, which may include multiple cache slots. The table 112-18 may also include a Disk Number column 112-18-02 storing information on the Disk 121 or Virtual Volume 140 number corresponding to the data stored in the cache slot. The value in the Disk Number column 112-18-02 can identify the related Disk 121 or Virtual Volume 140.

The Disk Address column 112-18-03 of the table 112-18 stores Disk address corresponding to the data stored in the cache slot. The Next Slot Pointer column 112-18-04 stores a Next cache slot number. In an embodiment of the inventive system, cache slots have a queue structure. The value "NULL" in the aforesaid column indicates the end of the queue.

The Kind of Queue Information column 112-18-11 stores information on the type of cache slot queue. The value "Free" in this column indicates the queue that has the unused cache slots. The value "Clean" indicates a queue that incorporates cache slots that stores the same data as the disk slots. The value "Dirty" indicates a queue that incorporates cache slots that stores data different from the data stored in the disk slots. Thus, the Storage Controller 110 needs to flush the cache slot data to the disk slot in the future. Finally, a Queue Index Pointer column 112-18-12 of the table 112-18 stores a value of the index of the cache slot queue.

Figure 21:
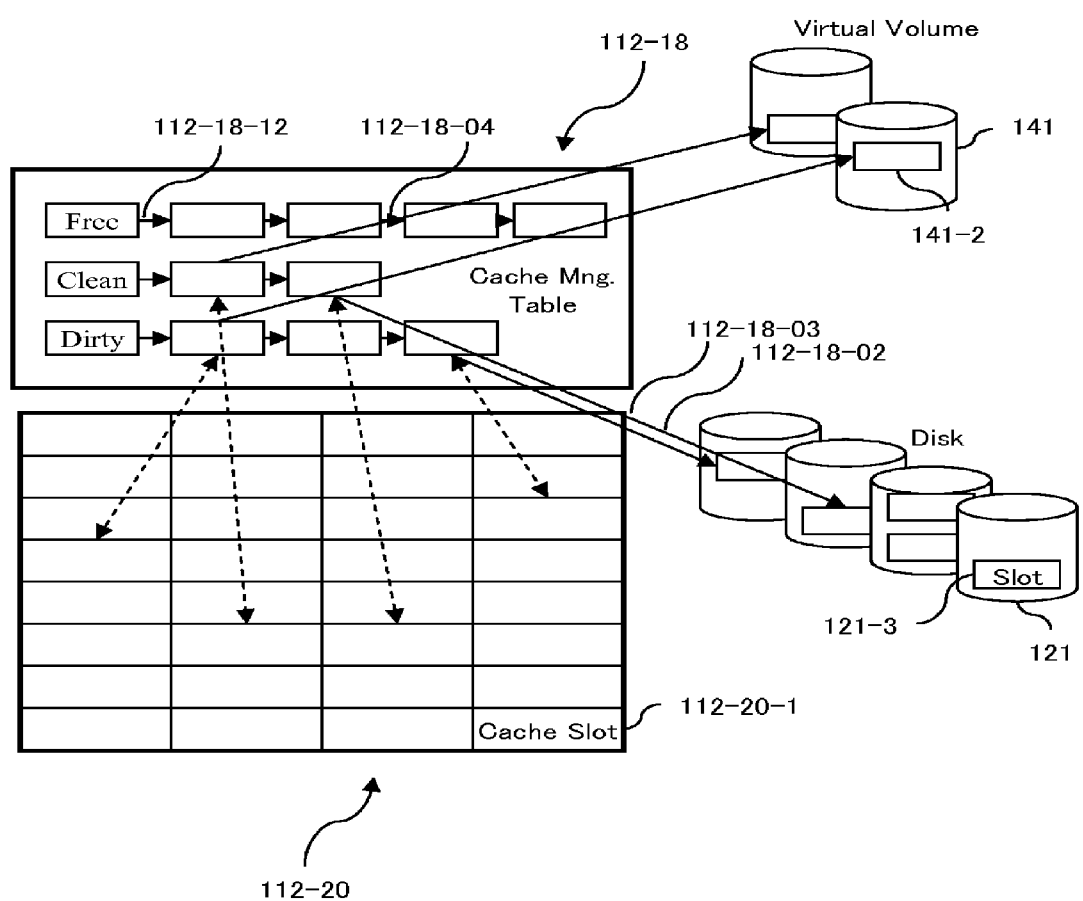
FIG. 21 illustrates the exemplary relationship of the Cache Slot, the Cache Management Table and the Disk Slot.

As mentioned hereinabove, the Memory 112 incorporates a Cache Area 112-20. This area may include multiple Cache Slots 112-20-1, as shown in FIG. 21. The Cache Slots 112-20-1 are managed by Cache Management Table 112-18. The Memory 112 may also incorporate a Buffer Area 112-21. The Buffer Area 112-21 provides temporary storage for work data.

Logical Structure

Figure 16:
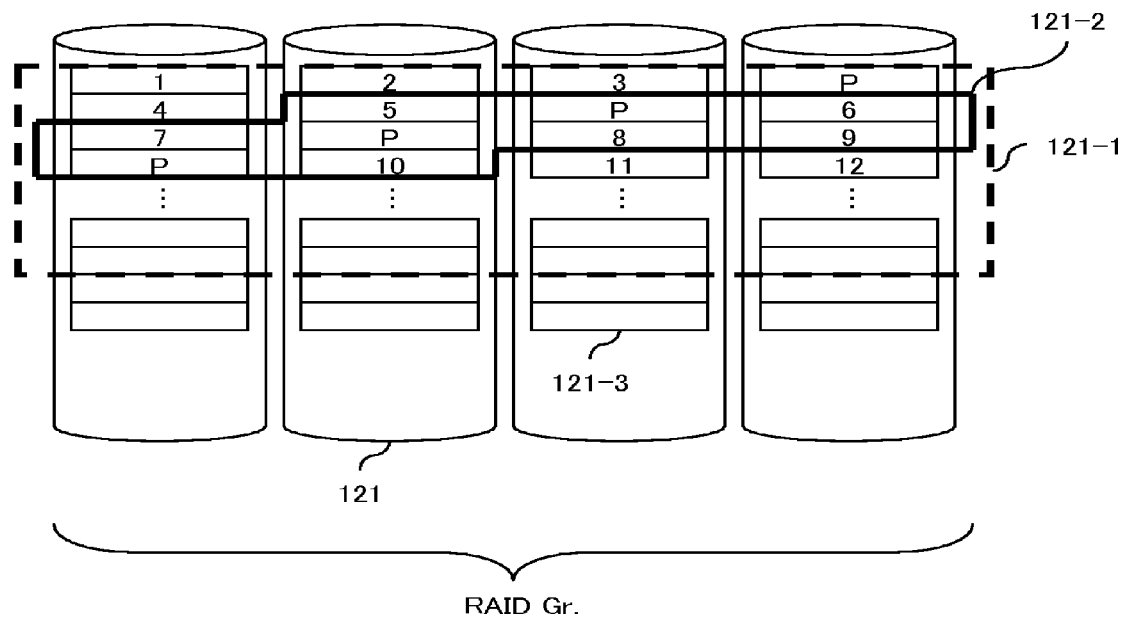
FIG. 16 illustrates the exemplary relationship of capacity pool chunk, capacity pool page and disk cache.

Now, the logical structure of the Storage Subsystem 100 will be described in detail. FIG. 16 illustrates the relationship of the capacity pool chunk, capacity pool page and disk cache. The Capacity Pool Chunk 121-1 consists of plural Disk Slots 121-3 in a RAID group. The Capacity Pool Chunk 121-1 can have 0 or more Capacity Pool Pages 121-2 in it. In an embodiment of the invention, the size of Capacity Pool Chunk 121-1 is fixed. A capacity Pool Page 121-2 consists of plural disk slots in a RAID group. The capacity Pool Page 121-2 can have 1 or more Disk Slots 121-3 in it. In an embodiment of the invention, the size of Capacity Pool Page 121-2 is variable. The Disk Slot 121-3 represents a stripe block of the RAID structure. In an embodiment of the invention, the size of Disk Slot 121-3 is fixed and is the same as the Cache Slot 112-20-1 size. The Disk Slot stores host data or parity data.

Figure 17:
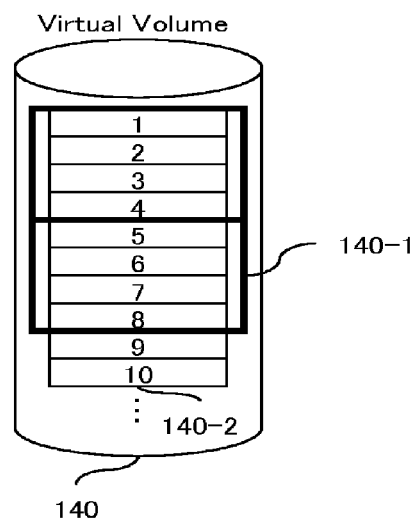
FIG. 17 illustrates the exemplary relationship of HDDs, RAID group, virtual volume page, virtual volume slot and virtual volume.

FIG. 17 illustrates the relationship of virtual volume page, virtual volume slot and virtual volume. The Virtual Volume 140 will now be described. The Host Computer 300 accesses the Virtual Volume 140 by means of I/O operations. The Virtual Volume 140 is allocated storage capacity from the capacity pool and includes one or more Virtual Volume Slots 140-2. The Virtual Volume 140 is allocated storage resources using a Virtual Volume Page 140-1. The Virtual Volume Page 140-1 includes one or more Virtual Volume Slots 140-2. The Virtual Volume Slot 140-2 has the same capacity as the Cache Slot 112-20-1 and Disk Slot 121-3.

Figure 18:
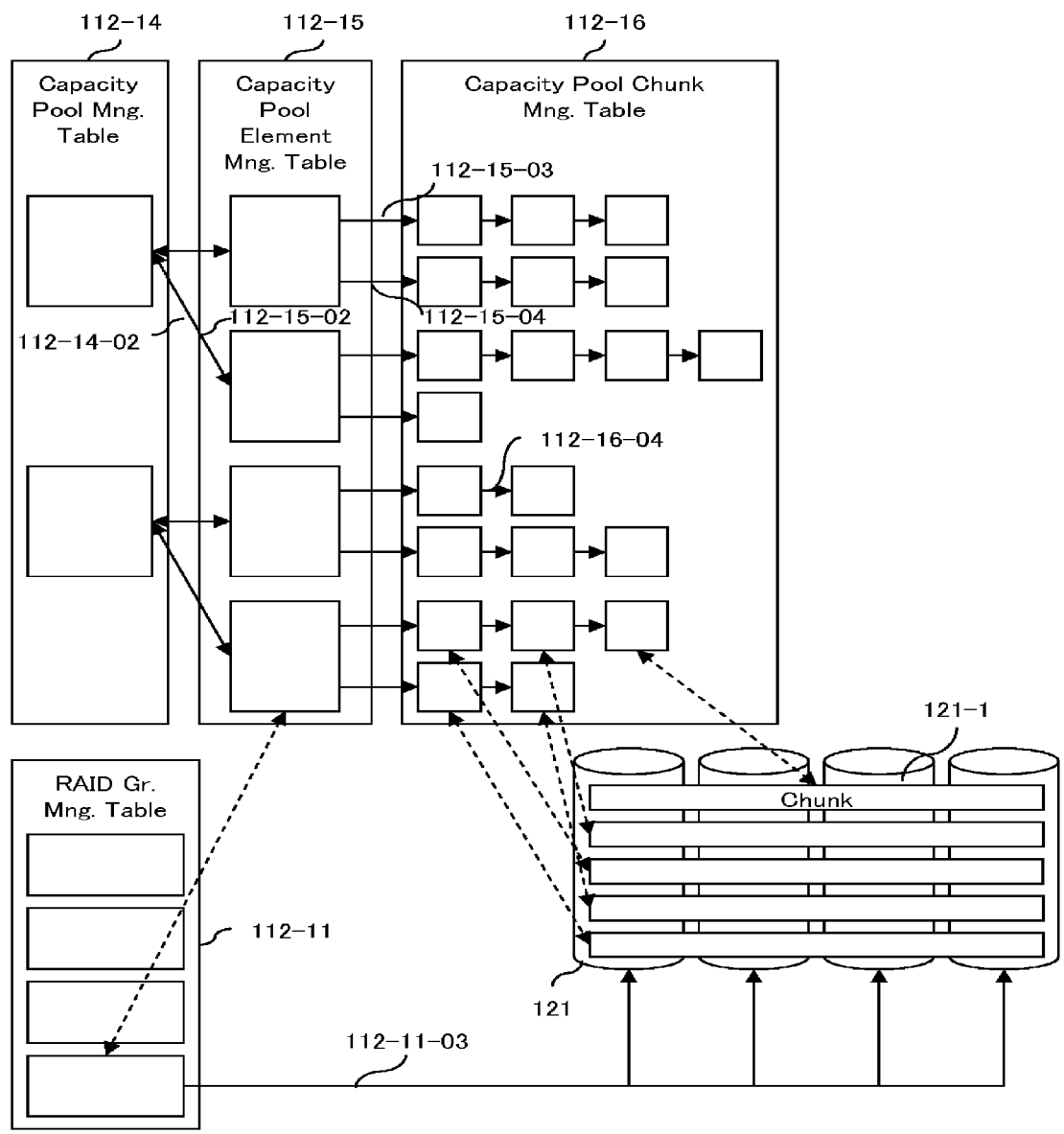
FIG. 18 illustrates the exemplary relationship of the Capacity Pool Management Table, the Capacity Pool Element Management Table, the Capacity Pool Chunk Management Table, the RAID Group Management Table and the Capacity Pool Chunks.

FIG. 18 illustrates the relationship of Capacity Pool Management Table 112-14, Capacity Pool Element Management Table 112-15, Capacity Pool Chunk Management Table 112-16, RAID Group Management Table 112-11 and Capacity Pool Chunks 121-1. Dashed line in FIG. 18 indicates a reference by pointer, while the solid line indicates reference by calculation. The Capacity Pool Management Table 112-14 references the Capacity Pool Element Management Table 112-15 using RAID Group List column 112-14-02. The Capacity Pool Element Management Table 112-15 references the Capacity pool Management Table 112-14 using Capacity Pool Number column 112-15-02. Capacity Pool Element Management Table 112-15 references Capacity Pool Chunk Management Table 122-16 using Free Chunk Queue column 112-15-03 and Used Chunk Queue column 112-15-04. The relationship of Capacity Pool Element Management Table 112-15 and RAID Group Management Table 112-11 is fixed. The relationship of Capacity Pool Chunk 121-1 and Capacity Pool Chunk Management Table 112-15 is also fixed.

Figure 19:
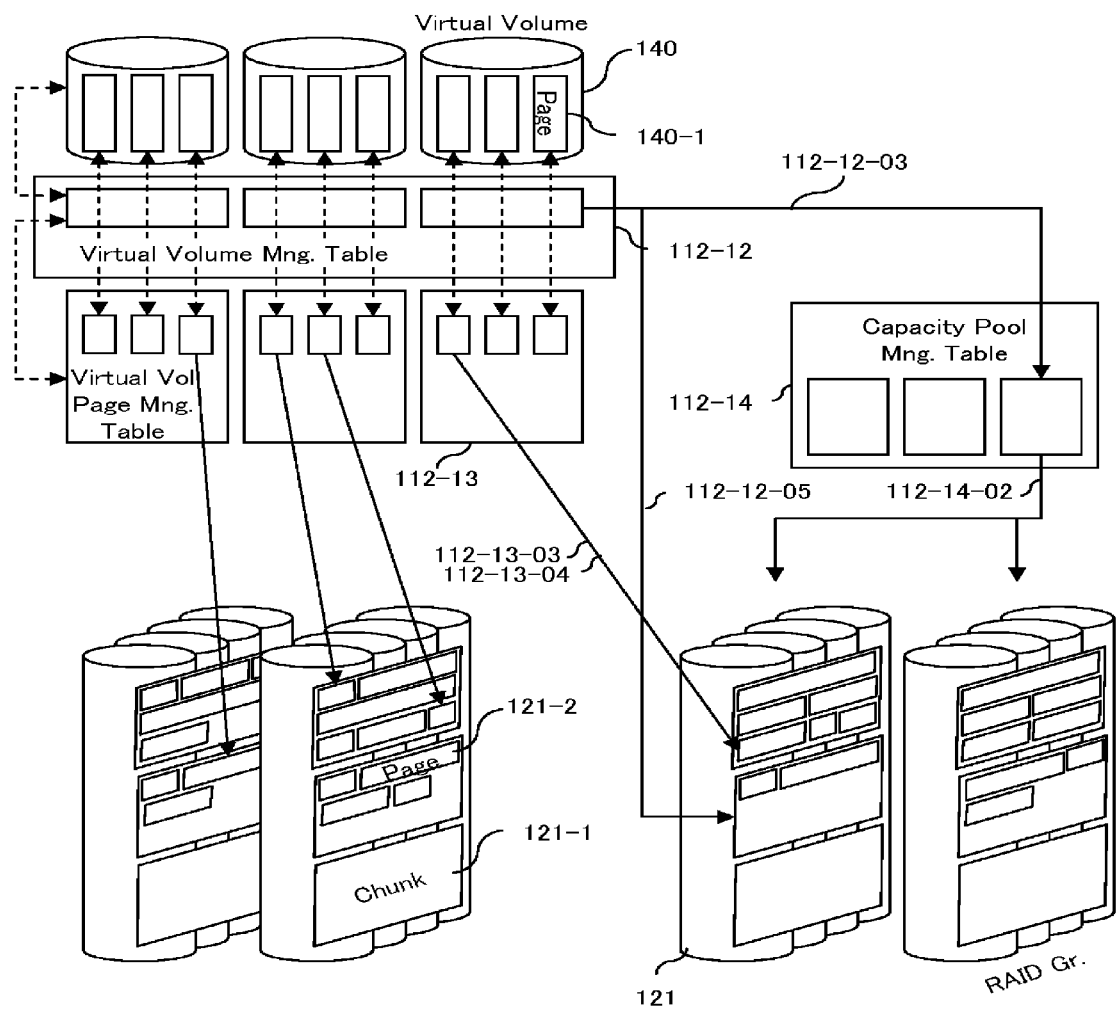
FIG. 19 illustrates the exemplary relationship of the Virtual Volume, the Virtual Volume Page, the Virtual Volume Management Table, the Virtual Volume Page Management Table, the Capacity Pool Management Table, the Capacity Pool Chunk, the Capacity Pool Page and the Capacity Pool Element Management Table.

FIG. 19 illustrates the relationship of the Virtual Volume 140, the Virtual Volume Page 140-1, the Virtual Volume Management Table 112-12, the Virtual Volume Page Management Table 112-13, the Capacity Pool Management Table 112-14, the Capacity Pool Chunk 121-1, the Capacity Pool Page 121-2 and the Capacity Pool Element Management Table. In that figure, a dashed line indicates a reference by pointer, while a solid line indicates a reference by calculation.

The Virtual Volume Management Table 112-12 references the Capacity Pool Management Table 112-14 using the Capacity Pool Number Information column 112-12-03. The Virtual Volume Management Table 112-12 references the allocated Capacity Pool Chunk 121-1 using Current Using Chunk Information column 112-12-05. The Capacity Pool Management Table 112-14 references the RAID group using the RAID Group List column 112-14-02. The Virtual Volume Page Management Table 112-13 references the Virtual Volume Page 121-2 using the Capacity Pool Page Address column 112-13-03 and Capacity Pool Page Size column 112-13-04.

The relationship of the Virtual Volume 140 and the Virtual Volume Management Table 112-12 is fixed. The relationship of Virtual Volume Management Table 112-12 and the Virtual Volume Page Management Table 112-13 is also fixed. The relationship of the Virtual Volume Page 140-1 and the Virtual Volume Page Management Table 112-13 is likewise fixed.

Figure 20:
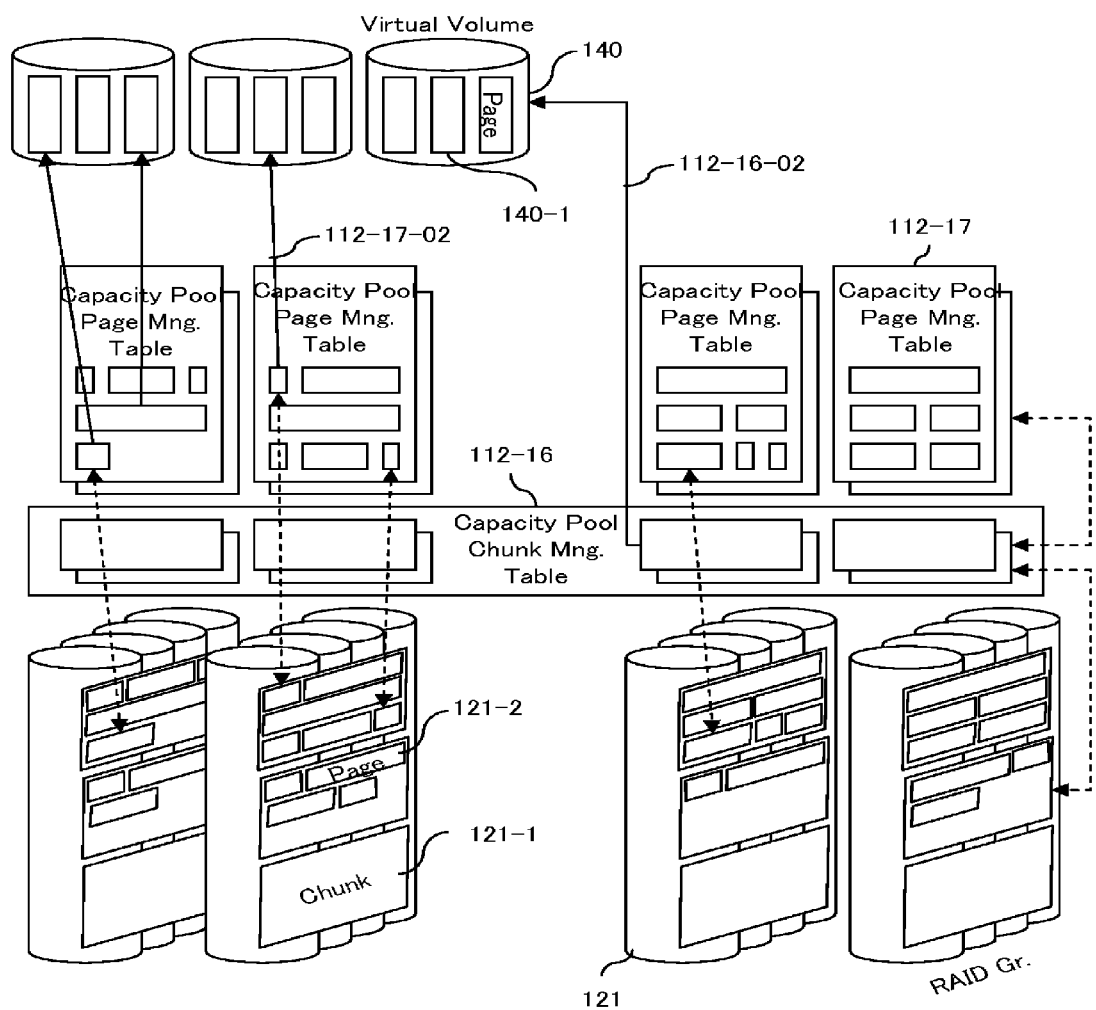
FIG. 20 illustrates the exemplary relationship of the Virtual Volume, the Virtual Volume Page, the Capacity Pool Chunk, the Capacity Pool Page and the Capacity Pool Element Management Table.

FIG. 20 illustrates the relationship of the Virtual Volume 140, the Virtual Volume Page 140-1, the Capacity Pool Chunk 121-1, the Capacity Pool Page 121-2 and the Capacity Pool Element Management Table. As in the previous figures, in this figure, a dashed line indicates a reference by pointer, while a solid line indicates a reference by calculation. The Capacity Pool Chunk Management Table 112-16 references the Virtual Volume 140 using Virtual Volume Number column 112-16-02. The Capacity Pool Page Management Table 112-17 references the Virtual Volume Page 140-1 using Virtual Volume Page Number column 112-17-02.

In an embodiment of the inventive system, the relationship of the Capacity Pool Chunk 121-1 and the Capacity Pool Chunk Management Table 112-16 is fixed. In an embodiment of the invention, the Capacity Pool Page Management Table 112-17 related to Capacity Pool Page 121-2 is found by seeking Capacity Pool Page Management Table 112-17.

FIG. 21 illustrates the relationship of the Cache Slot 112-20-1, the Cache Management Table 112-16 and the Disk Slot 121-3. As in the previous figures, a dashed line indicates a reference by pointer, while a solid line indicates a reference by calculation. The Cache Management Table 112-18 references the Disk Slot 121-3 using the Disk Number column 112-18-02 and the Disk Address column 112-18-03. In an embodiment of the invention, the relationship of Cache Management Table 112-18 and Cache Slot 112-20-1 is fixed.

Operational Flow Chart of the Storage System

Figure 22:
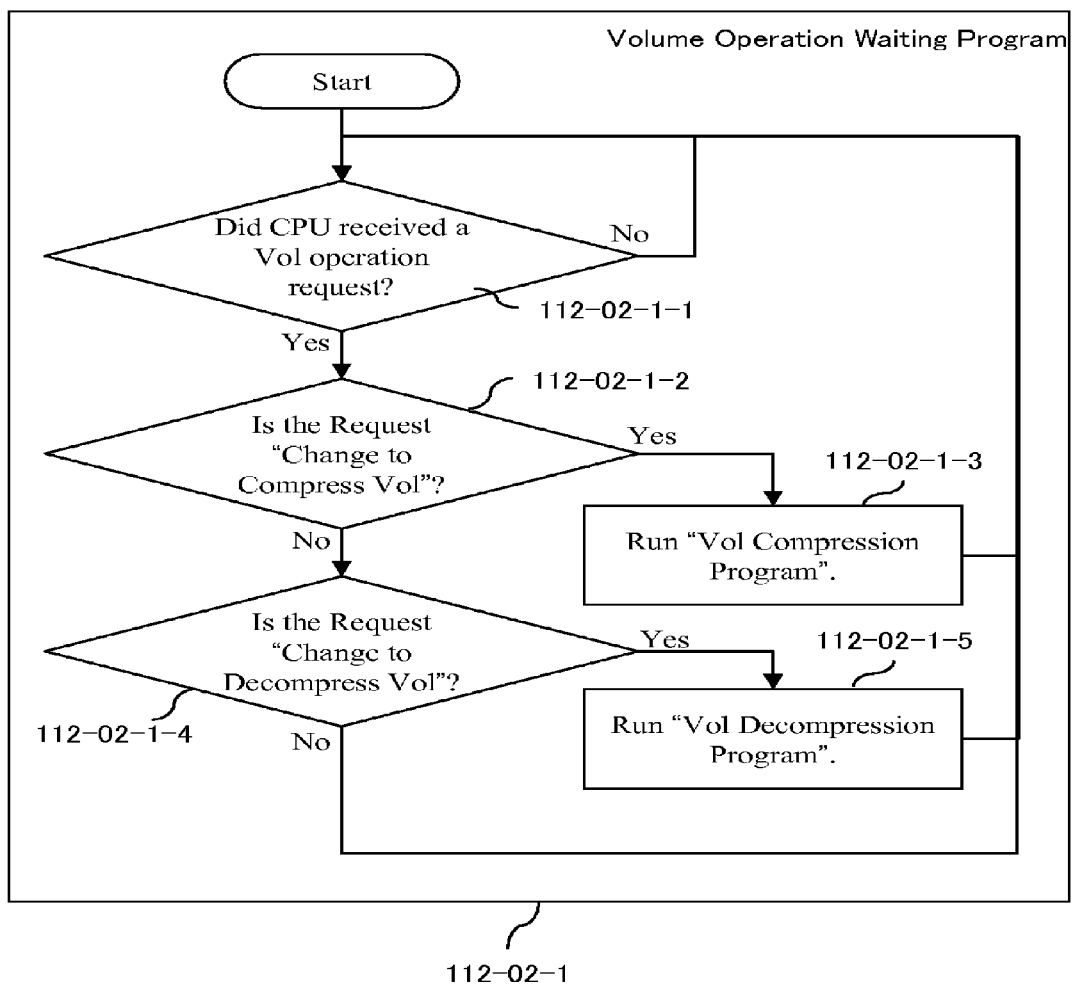
FIG. 22 illustrates an exemplary embodiment of an operational flow chart of the Volume Operation Waiting Program.

FIG. 22 illustrates an exemplary embodiment of an operational flow chart of the Volume Operation Waiting Program 112-02-1. The Volume Operation Waiting Program 112-02-1 includes one or more of the following steps.

At Step 112-02-1-1, the CPU 111 checks whether a volume operation request has been received. If it is determined that the CPU 111 has received the aforesaid request, the CPU 111 proceeds to Step 112-02-1-2. If the CPU 111 has not received the request, the CPU 111 repeats the Step 112-02-1-1.

At Step 112-02-1-2, the CPU 111 checks the type of the received request. If the CPU 111 received a "Change to Compress Volume" request, then the CPU 111 proceeds to Step 112-02-1-3. If the CPU 111 didn't receive the "Change to Compress Volume" request, then the CPU 111 proceeds to Step 112-02-1-4.

At Step 112-02-1-3, the CPU 111 calls Volume Compression Program 112-02-2 in order to compress the volume. After the completion of the Step 112-02-1-3, the CPU 111 returns to the Step 112-02-1-1.

At Step 112-02-1-4, the CPU 111 again checks the type of the received request. If the CPU 111 received a "Change to Decompress Volume" request, then the CPU 111 proceeds to Step 112-02-1-5. If the CPU 111 has not received the "Change to Decompress Volume" request, then the CPU 111 returns to the Step 112-02-1-1.

At Step 112-02-1-5, the CPU 111 calls the Volume Decompression Program 112-02-3 in order to decompress the volume. After the completion of the Step 112-02-1-5, the CPU 111 returns to the Step 112-02-1-1.

Figure 23:
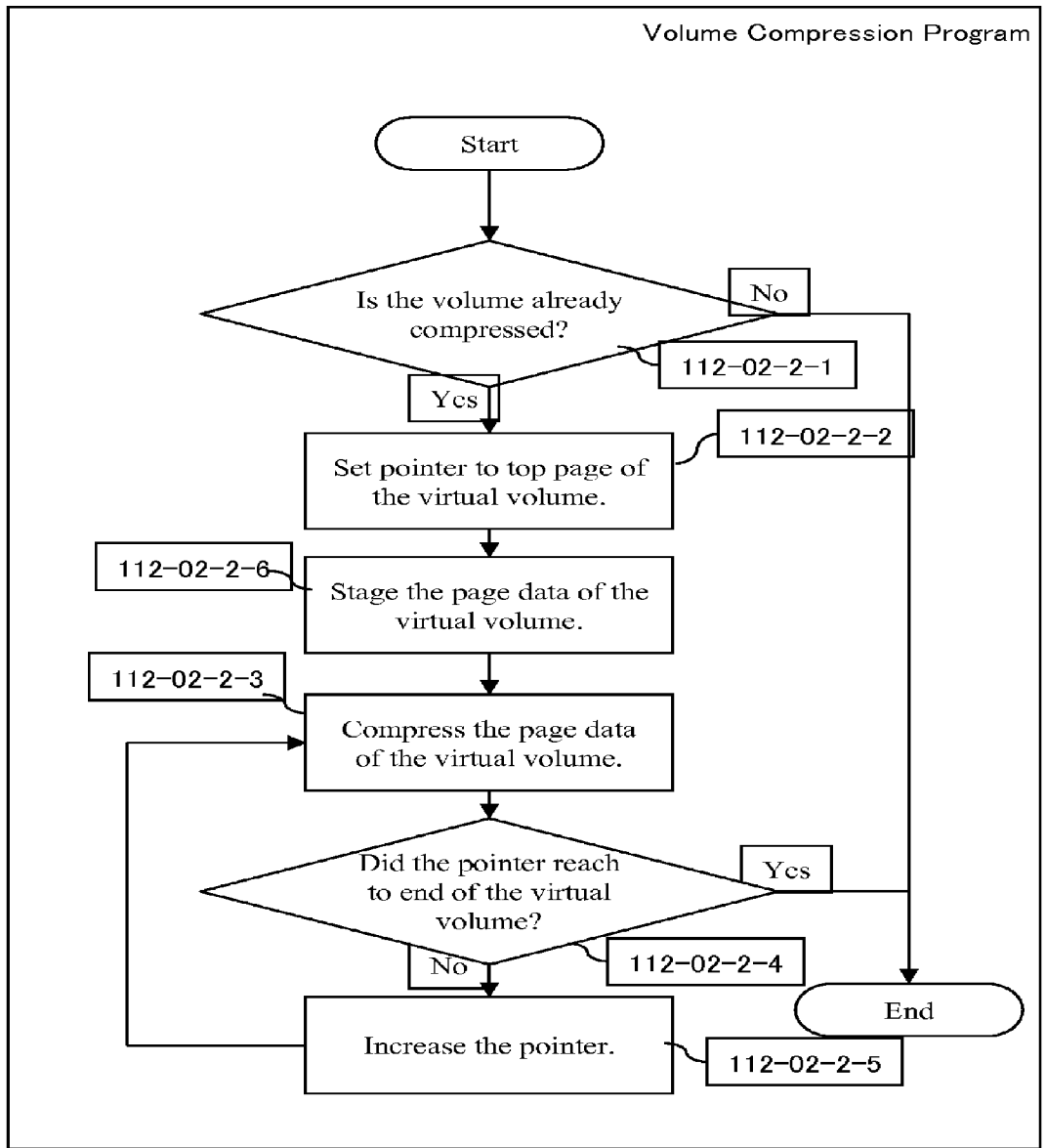
FIG. 23 illustrates an exemplary embodiment of an operational flow chart of the Volume Compression Program.

FIG. 23 illustrates an exemplary embodiment of an operational flow chart of the Volume Compression Program 112-02-2. Upon invocation of this program, it is provided with a volume number for compression. The Volume Compression Program 112-02-2 may include one or more of the following steps.

At Step 112-02-2-1, the CPU 111 checks whether or not the target volume is already compressed. If the value in the Volume Type Information column 112-12-04 corresponding to the target volume is "Thin Provisioning" or "Encrypted" then the CPU 111 proceeds to Step 112-02-2-2. If the corresponding value in the Volume Type Information column 112-12-04 is not "Thin Provisioning" or "Encrypted", then the CPU 111 terminates the execution of the Volume Compression Program 112-02-2.

At Step 112-02-2-2, the CPU 111 sets the value of the virtual volume pointer to the top of the target virtual volume. Specifically, the pointer is set to the first page of the virtual volume. After that, the CPU 111 proceeds to Step 112-02-2-6.

At Step 112-02-2-6, the CPU 111 calls the Cache Staging Program 112-05-2 in order to stage the page data 121 referenced by the aforesaid pointer from the HDDs. After the completion of the Step 112-02-2-6, the CPU 111 proceeds to Step 112-02-2-3.

At Step 112-02-2-3, the CPU 111 calls the Compression Program 112-06-1 in order to compress the page referenced by the aforesaid pointer. After the completion of the Step 112-02-2-3, the CPU 111 proceeds to the Step 112-02-2-4.

At Step 112-02-2-4, the CPU 111 checks whether or not the pointer has reached the end page of the virtual volume. If the pointer points to the aforesaid end page, then the CPU 111 terminates the execution of the Volume Compression Program 112-02-2. If the pointer does not point to the end page, then the CPU 111 proceeds to the Step 112-02-2-5.

At Step 112-02-2-5, the CPU 111 sets the pointer to point to the next page of the virtual volume.

Figure 24:
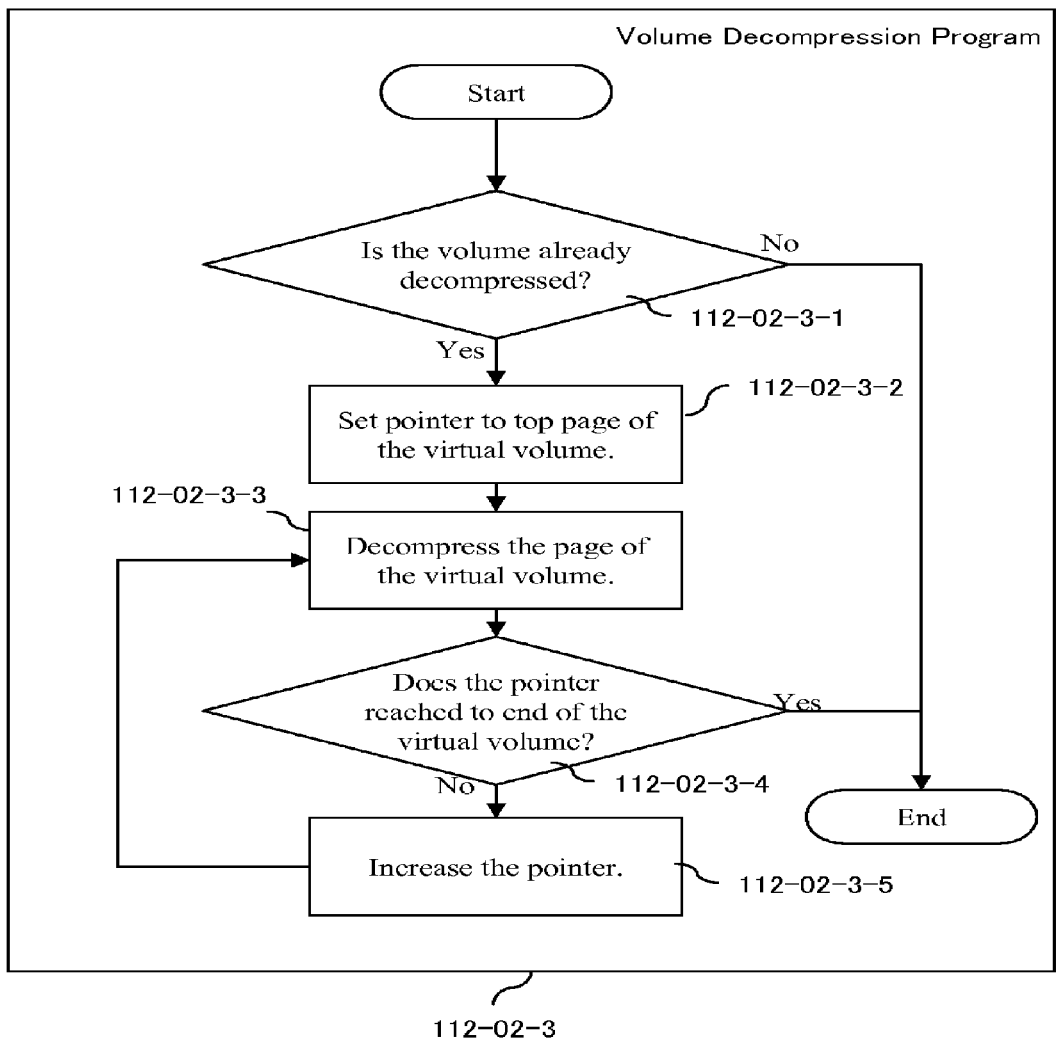
FIG. 24 illustrates an exemplary embodiment of an operational flow chart of the Volume Decompression Program.

FIG. 24 illustrates an exemplary embodiment of an operational flow chart of the Volume Decompression Program 112-02-3. When the aforesaid program is invoked, it is provided with a volume number to be decompressed. The Volume Decompression Program 112-02-3 may include one or more of the following steps.

At Step 112-02-3-1, the CPU 111 checks whether or not the target volume has already been decompressed. If the value in the Volume Type Information column 112-12-04 corresponding to the target volume is "Compressed" or "Encrypted & Compressed", then the CPU 111 proceeds to Step 112-02-3-2. If the corresponding value in the Volume Type Information column 112-12-04 is not "Compressed" or "Encrypted & Compressed", then the CPU 111 terminates the Volume Decompression Program 112-02-3.

At Step 112-02-3-2, the CPU 111 sets the pointer to first page of the virtual volume. Then, the CPU 111 proceeds to Step 112-02-3-3.

At Step 112-02-3-3, the CPU 111 decompresses the page pointed to by the pointer. To this end, the CPU 111 calls Decompression Program 112-06-2 to decompress the page. After the completion of the Step 112-02-3-3, the CPU 111 proceeds to the Step 112-02-3-4.

At Step 112-02-3-4, the CPU 111 checks whether or not the pointer has reached the end page of the virtual volume. If it is determined that the pointer points to the end page of the virtual volume, then the CPU 111 terminates the Volume Compression Program 112-02-3. If the pointer does not point to the end page of the virtual volume, then the CPU 111 proceeds to the Step 112-02-3-5.

At Step 112-02-3-5, the CPU 111 re-sets the pointer to point to the next page of the virtual volume.

Figure 25:
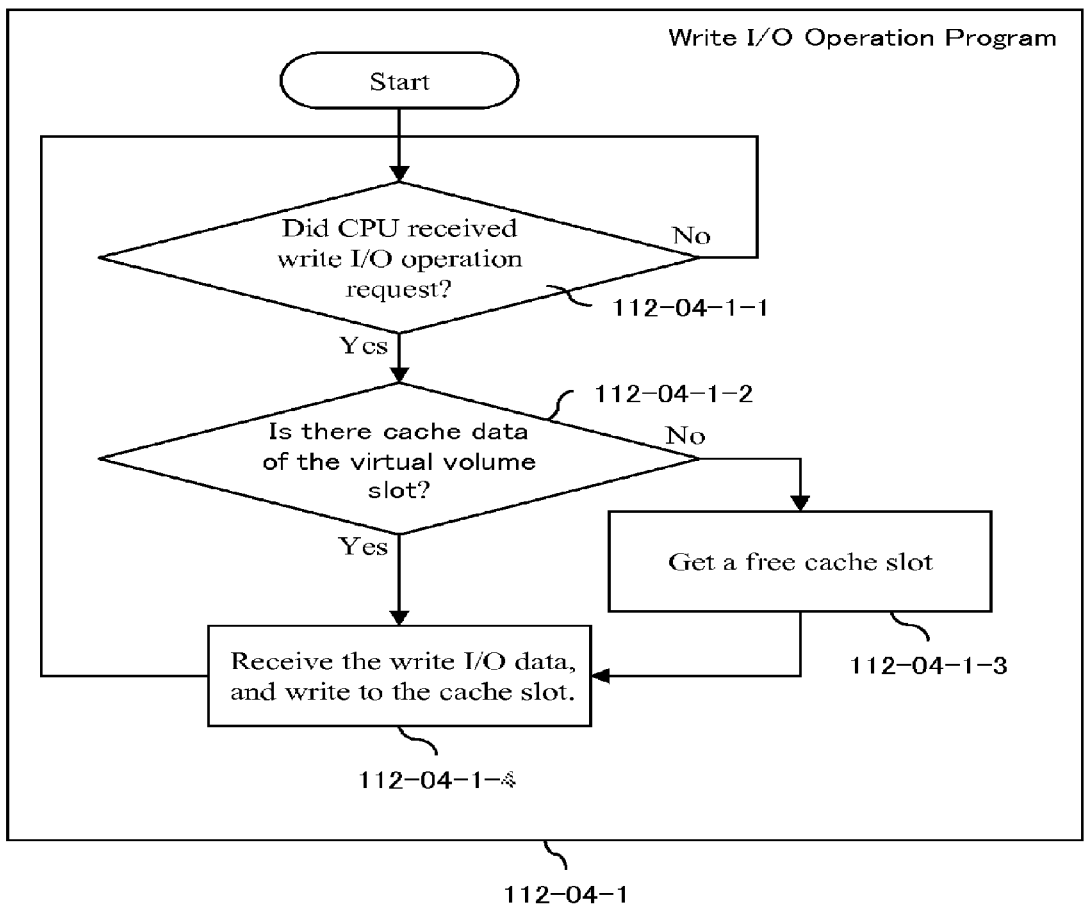
FIG. 25 illustrates an exemplary embodiment of an operational flow chart of the Write I/O Operation Program.

FIG. 25 illustrates an exemplary embodiment of an operational flow chart of the Write I/O Operation Program 112-04-1. An embodiment of the Write I/O Operation Program 112-04-1 may include one or more of the following steps.

At Step 112-04-1-1, the CPU 111 checks whether or not a write I/O request has been received. If CPU 111 determines that the request has been received, then the CPU 111 proceeds to Step 112-04-1-2. If CPU 111 did not receive the request, then the CPU 111 repeats the Step 112-04-1-1.

At Step 112-04-1-2, the CPU 111 searches a record in the Cache Management Table 112-20 referenced by the "Clean" or "Dirty" queue to locate Cache Slot 112-20-1 of the I/O. If CPU finds the appropriate Cache Slot 112-20-1, then the CPU 111 proceeds to Step 112-04-1-4. If CPU does not find the Cache Slot 112-20-1, then the CPU 111 proceeds to Step 112-04-1-3.

At Step 112-04-1-3, the CPU 111 obtains a Cache Slot 112-20-1 that is linked to the "Free" queue of the Cache Management Table 112-20. After that, the CPU 111 proceeds to Step 112-04-1-4.

At Step 112-04-1-4, the CPU 111 transfers the write I/O data to the Cache Slot 112-20-1 from the Host Computer 300. After that, the CPU 111 returns to the Step 112-04-1-1.

Figure 26:
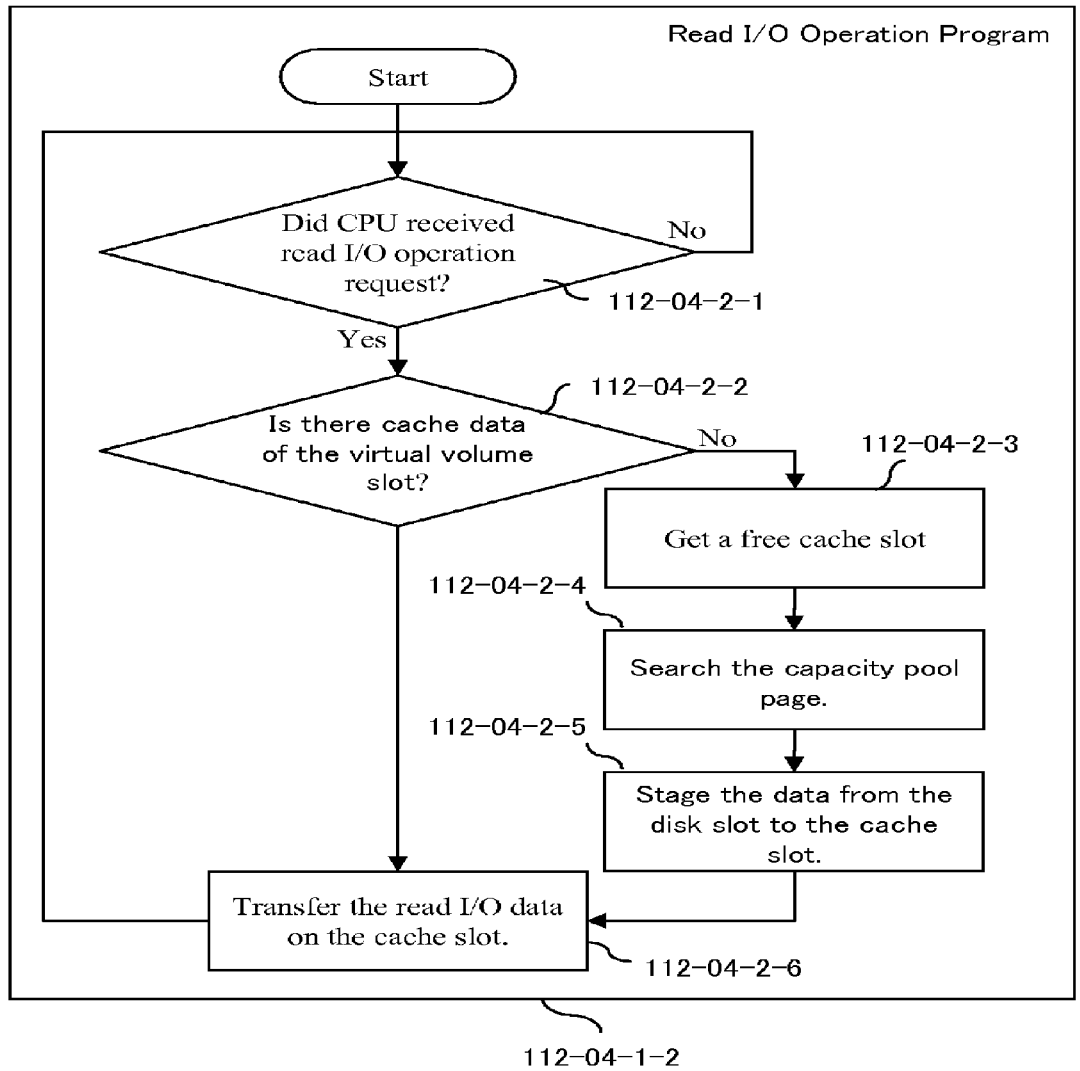
FIG. 26 illustrates an exemplary embodiment of an operational flow chart of the Read I/O Operation Program.

FIG. 26 illustrates an exemplary embodiment of an operational flow chart of the Read I/O Operation Program 112-04-2. The exemplary embodiment of the Read I/O Operation Program 112-04-2 may include one or more of the following steps.

At Step 112-04-2-1, the CPU 111 checks whether or not a read I/O request has been received. If CPU 111 determines that the aforesaid request has been received, then the CPU 111 proceeds to Step 112-04-2-2. If the CPU 111 did not receive the request, then the CPU 111 repeats the Step 112-04-2-1.

At Step 112-04-2-2, the CPU 111 searches the records of the Cache Management Table 112-20 linked to "Clean" or "Dirty" queue to find Cache Slot 112-20-1 of the I/O request. If the CPU successfully finds the Cache Slot 112-20-1, then the CPU 111 proceeds to Step 112-04-1-6. If CPU could not find the Cache Slot 112-20-1, then the CPU 111 proceeds to Step 112-04-1-3.

At Step 112-04-2-3, the CPU 111 obtains a Cache Slot 112-20-1 that is linked to "Free" queue of Cache Management Table 112-20. After that, the CPU 111 proceeds to Step 112-04-2-4.

At Step 112-04-2-4, the CPU 111 finds the Capacity Pool Page 121-2 referenced by the Virtual Volume Page by searching the Virtual Volume Page Management Table 112-13. After that, the CPU 111 proceeds to Step 112-04-2-5.

At Step 112-04-2-5, the CPU 111 invokes the Cache Staging Program 112-05-2 in order to transfer the data from the Disk Slot 121-3 to the Cache Slot 112-20-1. After the completion of the Step 112-04-2-5, the CPU 111 proceeds to Step 112-04-2-6.

At Step 112-04-2-6, the CPU 111 transfers the read I/O data from the Cache Slot 112-20-1 to the Host Computer 300. After that, the CPU 111 returns to the Step 112-04-2-1.

Figure 27:
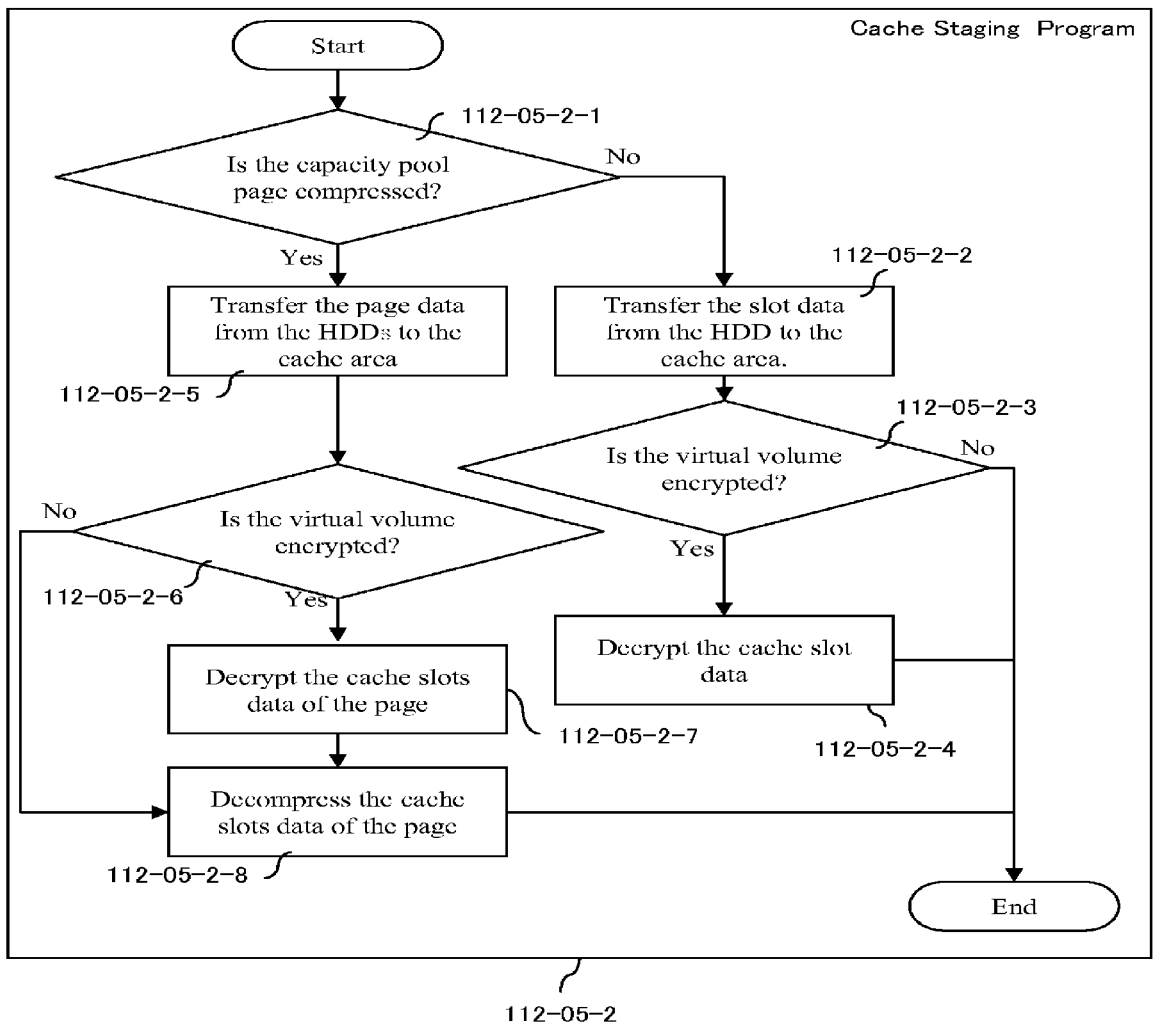
FIG. 27 illustrates an exemplary embodiment of an operational flow chart of the Cache Staging Program.

FIG. 27 illustrates an exemplary embodiment of an operational flow chart of the Cache Staging Program 112-05-2. When this program is invoked, it is provided with a staging (transfer from disk to cache memory) slot information. The Cache Staging Program 112-05-2 may include one or more of the following steps.

At Step 112-05-2-1, the CPU 111 checks whether or not the page has been compressed. If the value in the Capacity Pool Page Size column 112-13-04 indicates a default page size, the CPU 111 determines that that the page has been compressed. If the page has been compressed, then the CPU 111 proceeds to Step 112-05-2-5. If the page has not been compressed, then the CPU 111 proceeds to Step 112-05-2-2.

At Step 112-05-2-2, the CPU 111 transfers the slot data from the Disk Slot 121-3 to the Cache Slot 112-20-1. After that, the CPU 111 proceeds to Step 112-05-2-3.

At Step 112-05-2-3, the CPU 111 checks whether or not the page has been encrypted. Specifically, if the corresponding value in the Volume Type Information column 112-12-04 is "Encrypted" or "Encrypted & Compressed", then the CPU 111 determines that the page has been encrypted. If the page has been encrypted, then the CPU 111 proceeds to Step 112-05-2-4. If the page has not been encrypted, then the CPU 111 terminates the Cache Staging Program 112-05-2.

At Step 112-05-2-4, the CPU calls the Decryption Program 112-07-2 in order to decrypt the slot. After the completion of the Step 1112-05-2-4, the CPU 111 terminates the Cache Staging Program 112-05-2.

At Step 112-05-2-5, the CPU 111 searches the Cache Management Table 112-18 for the Cache Slots 112-20-1 of the page that the slot belongs to, and the CPU 111 obtains cache slots for the slots that are not in the Cache Management Table 112-18. After that, the CPU 111 transfers all slots of the page that the slot belongs to from Disk Slots 121-3 to Cache Slot 112-20-1. After that, the CPU 111 proceeds to the Step 112-05-2-6.

At Step 112-05-2-6, the CPU 111 checks whether or not the page has been encrypted. If the value in the corresponding Volume Type Information column 112-12-04 is "Encrypted" or "Encrypted & Compressed", then the CPU 111 determines that the page has been encrypted. If the page has been encrypted, then the CPU 111 proceeds to Step 112-05-2-7. If the page has not been encrypted, then the CPU 111 terminates the Cache Staging Program 112-05-9.

At Step 112-05-2-7, the CPU 111 invokes the Decryption Program 112-07-2 in order to decrypt the page that the slot belongs to. After the completion of the Step 1112-05-2-4, the CPU 111 proceeds to Step 112-05-2-8.

At Step 112-05-2-8, the CPU 111 calls the Decompression Program 112-06-2 in order to decompress the page that the slot belongs to. After the completion of the Step 1112-05-2-8, the CPU 111 terminates the Cache Staging Program 112-05-2.

Figure 28:
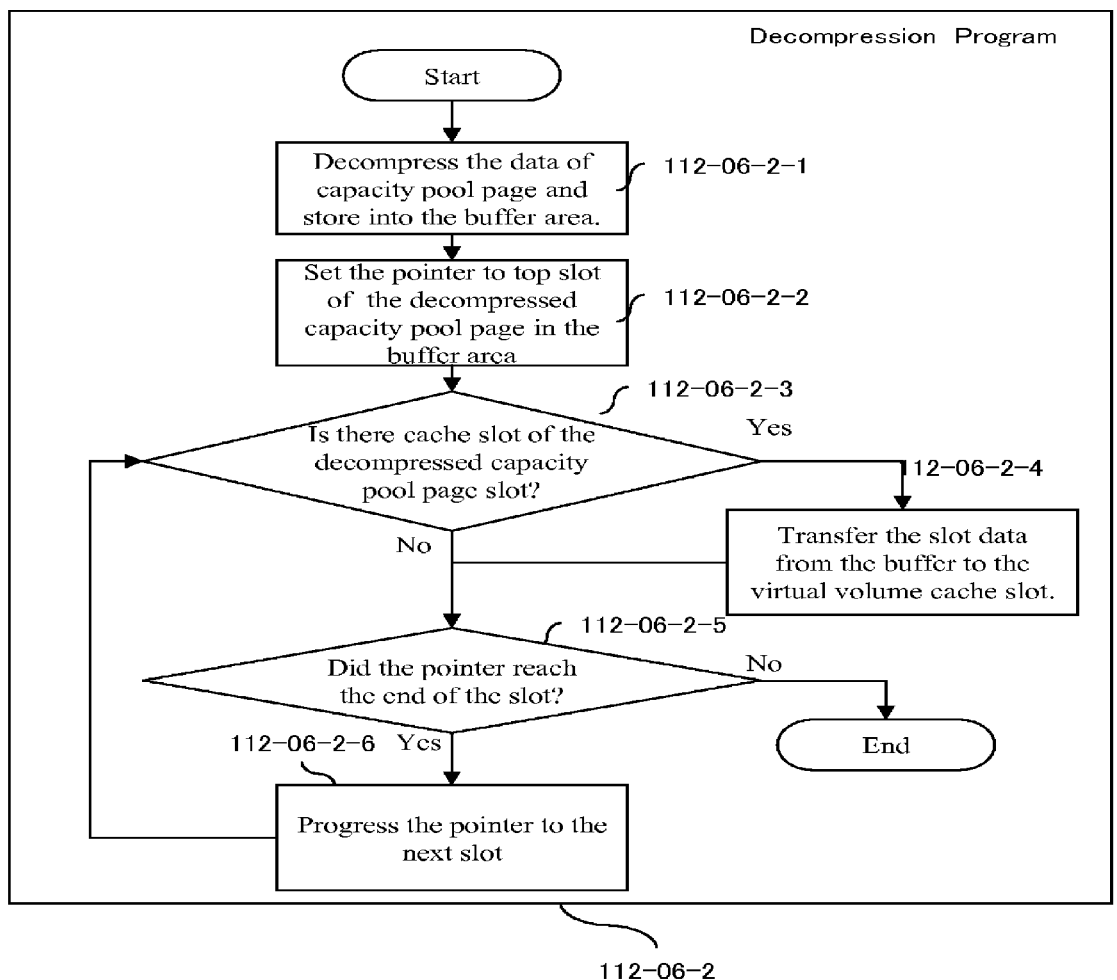
FIG. 28 illustrates an exemplary embodiment of an operational flow chart of the Decompression Program.

FIG. 28 illustrates an exemplary embodiment of an operational flow chart of the Decompression Program 112-06-2. Upon its invocation, the Decompression Program 112-06-2 is provided with a page for decompression. The Decompression Program 112-06-2 may include one or more of the following steps.

At Step 112-06-2-1, the CPU 111 reads the Cache Slots 112-20-1 of the page. After that, the page is being decompressed and stored in the Buffer Area 112-21. Then, the CPU 111 proceeds to Step 112-06-2-2.

At Step 112-06-2-2, the CPU 111 sets a pointer to the first slot number of the decompressed page in Buffer Area 112-21. After that, the CPU 111 proceeds to Step 112-06-2-3.

At Step 112-06-2-3, the CPU 111 searches the Cache Management Table 112-18 and determines whether the Virtual Volume 140 has a Cache Slot 112-20-1 that relates to the decompressed slot. If the Virtual Volume 140 has a Cache Slot 112-20-1 that relates to the decompressed slot, then the CPU proceeds to Step 112-06-2-4. If the Virtual Volume 140 does not have a Cache Slot 112-20-1 that relates to the decompressed slot, then the CPU 111 proceeds to Step 112-06-2-5.

At Step 112-06-2-4, the CPU 111 transfers the decompressed slot from the Buffer Area 112-21 to the related Cache Slot 112-20-1 of the Virtual Volume Slot 140-2. After that, the CPU 111 proceeds to Step 112-06-2-5.

At Step 112-06-2-5, the CPU 111 determines whether the pointer reached the last slot of the decompressed page in the Buffer Area 112-21. If the pointer has reached the last slot, then the CPU 111 terminates the Decompress Program 112-06-2. If the pointer has not reached the last slot, then the CPU 111 proceeds to Step 112-06-2-6.

At Step 112-06-2-6, the CPU 111 sets the pointer to the next slot. After that, the CPU 111 returns to Step 112-06-2-3.

Figure 29:
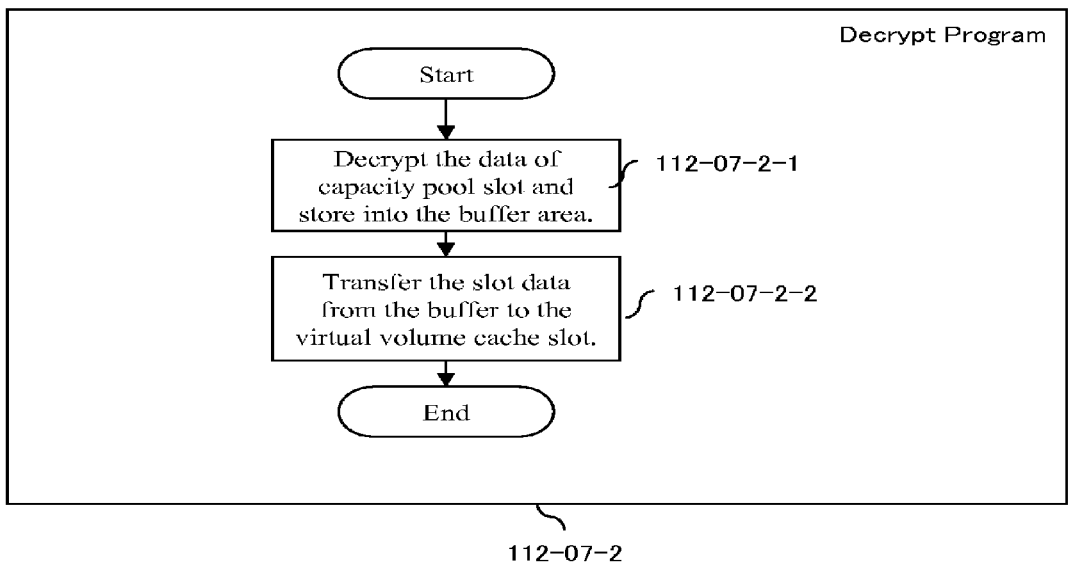
FIG. 29 illustrates an exemplary embodiment of an operational flow chart of the Decryption Program.

FIG. 29 illustrates an exemplary embodiment of an operational flow chart of the Decryption Program 112-07-2. When the program is invoked, it is provided with a slot for decryption. The Decryption Program 112-07-2 may include one or more of the following steps.

At Step 112-07-2-1, the CPU 111 reads the Cache Slot 112-20-1 of the Disk Slot 121-3, decrypts the page, and stores it in the Buffer Area 112-21. After that, the CPU 111 proceeds to Step 112-07-2-2.

At Step 112-07-2-2, the CPU 111 copies the decrypted slot in Buffer Area 112-21 to the Cache Slot 112-20-1 of the Virtual Volume Slot 121-3. After that, the CPU 111 terminates the Decryption Program 112-07-2.

Figure 30:
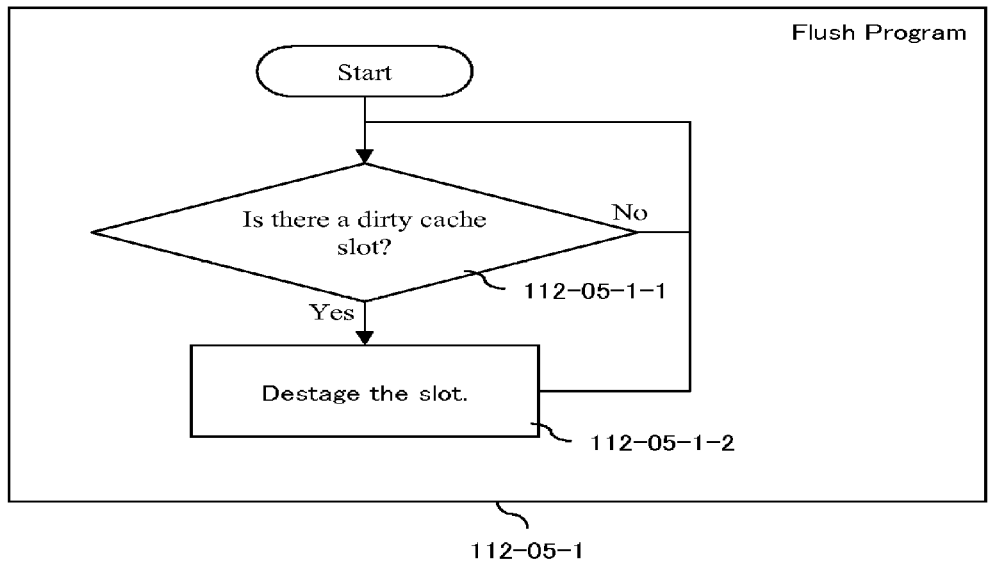
FIG. 30 illustrates an exemplary embodiment of an operational flow chart of the Disk Flushing Program.

FIG. 30 illustrates an exemplary embodiment of an operational flow chart of the Disk Flushing Program 112-05-1. The Disk Flushing Program 112-05-1 may include one or more of the following steps.

At Step 112-05-1-1, the CPU 111 searches "Dirty" queue of Cache Management Table 112-18 and obtains the first slot of the queue. After that, the CPU 111 proceeds to Step 112-05-1-2.

At Step 112-05-1-2, the CPU calls the Cache Destaging Program 112-05-3. After the completion of the Step 112-05-1-2, the CPU 111 returns to Step 112-05-1-1.

Figure 31:
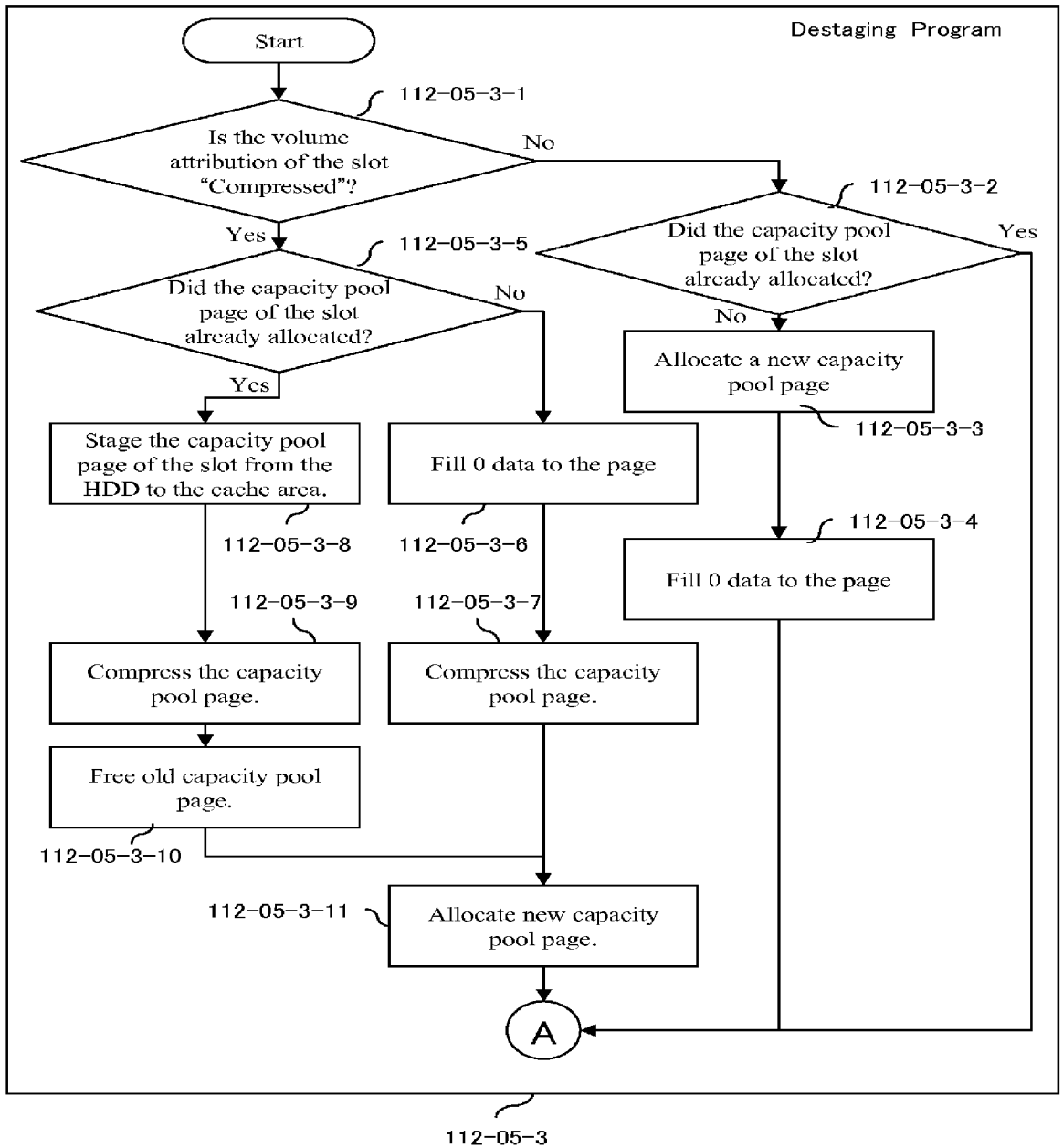
FIG. 31 illustrates an exemplary embodiment of an operational flow chart of the Cache Destaging Program.
Figure 32:
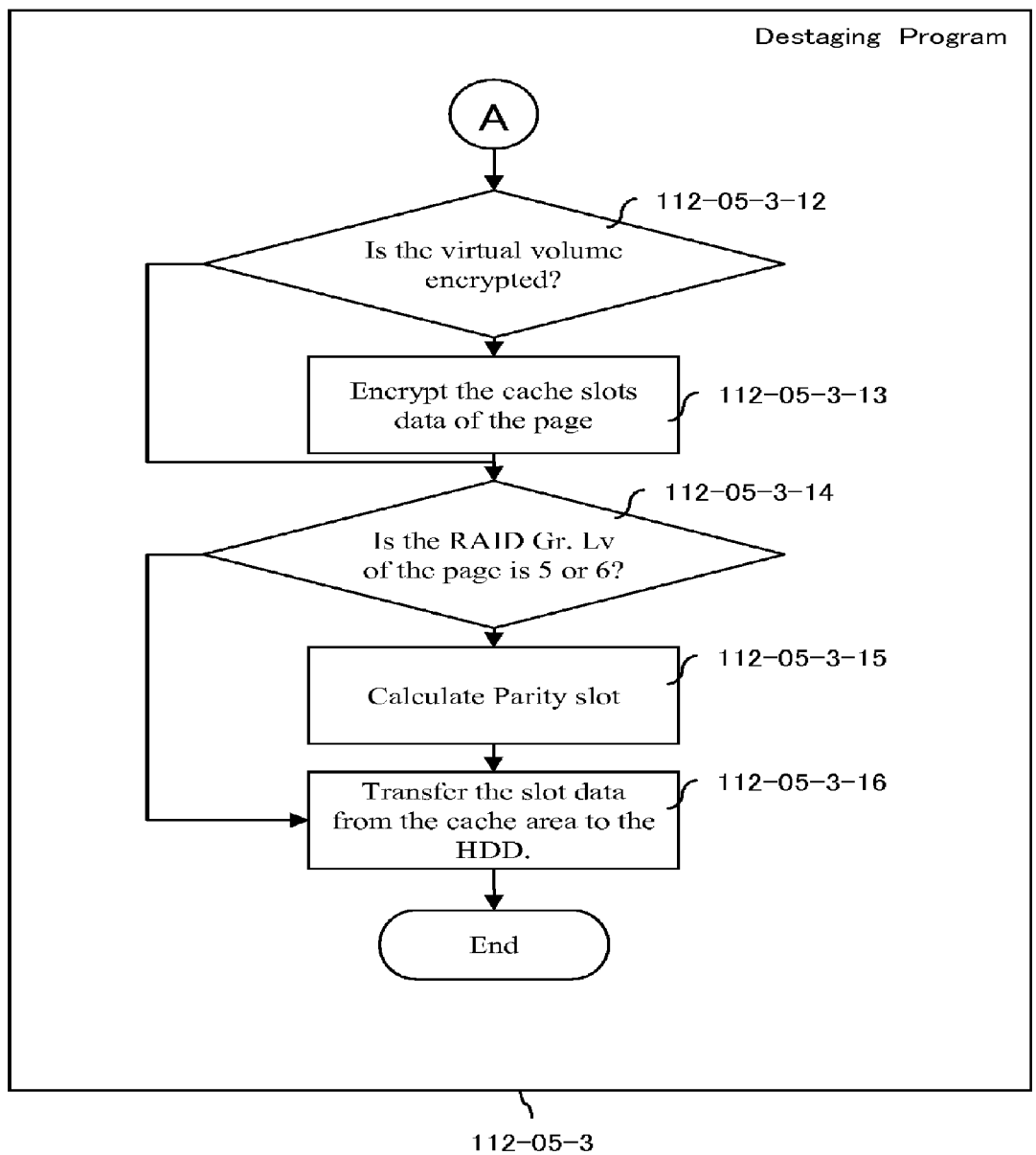
FIG. 32 illustrates an exemplary embodiment of an operational flow chart of the Cache Destaging Program.

FIGS. 31 and 32 illustrate exemplary embodiments of an operational flow charts of the Cache Destaging Program 112-05-3. Upon invocation of this program, it is provided with a destaging (transfer to cache memory from disk) slot. In one embodiment of the invention, the Cache Destaging Program 112-05-3 may include one or more of the following steps.

At Step 112-05-3-1, the CPU 111 checks whether or not the page of the slot needs to be compressed. If the corresponding value in the Volume Type Information column 112-12-04 is "Compressed" or "Encrypted & Compressed", the CPU 111 determines that the page of the slot needs to be compressed. If the page of the slot needs to be compressed, then the CPU 111 proceeds to Step 112-05-3-5. If the page of the slot does not need to be compressed, then the CPU 111 proceeds to Step 112-05-3-2.

At Step 112-05-3-2, the CPU 111 checks the Virtual Volume Page Management Table 112-13 to determine whether or not the page of the slot has already been allocated. If the page has already been allocated, then the CPU 111 proceeds to Step 112-05-3-12. If the page has not been allocated yet, then the CPU 111 proceeds to Step 112-05-3-3.

At Step 112-05-3-3, the CPU 111 reads the record in the Capacity Pool Page Management table 112-17 that is referenced by the Current Using Chunk Information 112-12-05. After that, the CPU 111 registers the Virtual Volume Page 140-1 into the Current Using Chunk Information 112-12-05. The size of the virtual volume page is determines by the value of the Virtual Volume Page 140-1 record. If the free area of the Virtual Volume Page 140-1 that Current Using Chunk Information 112-12-05 refers to is less than Virtual Volume Page 140-1 size, then the CPU 111 links this Virtual Volume Page 140-1 to "Used Chunk Queue" of Capacity Pool Element Management Table 112-15, and obtains a new one form the "Free Chunk Queue". After that, the CPU 111 registers the Capacity Pool Page 121-2 into the Virtual Volume Page Management table 112-13. The size of the page is determined by the corresponding value in the Virtual Volume Page 140-1 record. After that, the CPU 111 proceeds to Step 112-05-3-4.

At Step 112-05-3-4, the CPU 111 fills the Disk Slot 121-3 of the newly allocated page with "0" data in order to format the page, except for page areas having existing data stored therein. After that, the CPU 111 proceeds to Step 112-05-3-5.

At Step 112-05-3-5, the CPU 111 checks Virtual Volume Page Management Table 112-13 to determine whether or not the page of the slot has already been allocated. If the page has already been allocated, then the CPU 111 proceeds to Step 112-05-3-8. If the page has not been allocated yet, then the CPU 111 proceeds to Step 112-05-3-6.

At Step 112-05-3-6, the CPU 111 fills the Cache Slot 112-20-1 of Virtual Volume Page 140-1 with "0" data, except for areas having existing data stored therein. After that, the CPU 111 proceeds to Step 112-05-3-7.

At Step 112-05-3-7, the CPU 111 invokes the Compression Program 112-06-1 in order to compress the Virtual Volume Page 140-1. After the completion of the Step 112-05-3-7, the CPU 111 proceeds to Step 112-05-3-11.

At Step 112-05-3-8, the CPU 111 calls the Cache Staging Program 112-05-2 to stage and merge the page. After the completion of the Step 112-05-3-8, the CPU 111 proceeds to Step 112-05-3-9.

At Step 112-05-3-9, the CPU 111 calls the Compression Program 112-06-1 in order to compress the Virtual Volume Page 140-1. After the completion of the Step 112-05-3-9, the CPU 111 proceeds to Step 112-05-3-10.

At Step 112-05-3-10, the CPU 111 dis-enrolls the current allocated Capacity Pool Page 121-2 from Virtual Volume Page Management Table 112-13 and dis-enrolls the current allocated Virtual Volume Page 140-1 from Capacity Pool Page Management Table 112-17 and appropriately increases the Deleted Capacity Information 112-16-04. After that, the CPU 111 proceeds to Step 112-05-3-11.

At Step 112-05-3-11, the CPU 111 registers the Virtual Volume Page 140-1 into the Current Using Chunk Information 112-12-05. The size of the registered page is the compressed page size. If the free area of Virtual Volume Page 140-1 that Current Using Chunk Information 112-12-05 refers is less than Virtual Volume Page 140-1 size, CPU 111 links this Virtual Volume Page 140-1 to "Used Chunk Queue" of Capacity Pool Element Management Table 112-15, and obtains a new one form "Free Chunk Queue". After that, the CPU 111 registers Capacity Pool Page 121-2 into Virtual Volume Page Management table 112-13. The size of the registered page is the compressed page size. After that, the CPU 111 proceeds to Step 112-05-3-4 and Step 112-05-3-12.

At Step 112-05-3-12, the CPU 111 checks whether or not the page of the slot needs to be encrypted. If the corresponding value in the Volume Type Information column 112-12-04 is "Encrypted" or "Encrypted & Compressed", then the CPU 111 determines that the page of the slot needs to be encrypted. If the page of the slot needs to be encrypted, then the CPU 111 proceeds to Step 112-05-3-13. If the page of the slot doesn't need to be encrypted, then the CPU 111 proceeds to Step 112-05-3-14.

At Step 112-05-3-13, the CPU 111 calls the Encrypt Program 112-06-1 to encrypt the slot(s). After the completion of the Step 112-05-3-8, the CPU 111 proceeds to Step 112-05-3-14.

At Step 112-05-3-14, the CPU 111 checks whether or not the slots are needed to make parity data. If the RAID Level Information is "5" or "6", the CPU 111 determines that the slots are needed to make parity data. If it is determined that the slots are needed to make parity data, then the CPU 111 proceeds to Step 112-05-3-15. If the slots are not needed to make parity data, then the CPU 111 proceeds to Step 112-05-3-16.

At Step 112-05-3-15, the CPU 111 makes parity data from Disk Slots 121-3 in the same stripe line, and stores the parity data in Cache Slot 112-20-1. After that, the CPU 111 proceeds to Step 112-05-3-16.

At Step 112-05-3-16, the CPU 111 transfers Cache Slots 112-20-1 to Disk Slots 121-3 (if the disks are arranged in a RAID1 configuration, the CPU 111 transfers the Cache Slots 112-20-1 to two Slots 121-3), and after the transfer, the CPU 111 links the Cache Slots 112-20-1 to the "Clean" queue of Queue Index Pointer column 112-18-12. After that, the CPU 111 terminates the Destaging Program 112-05-3.

Figure 33:
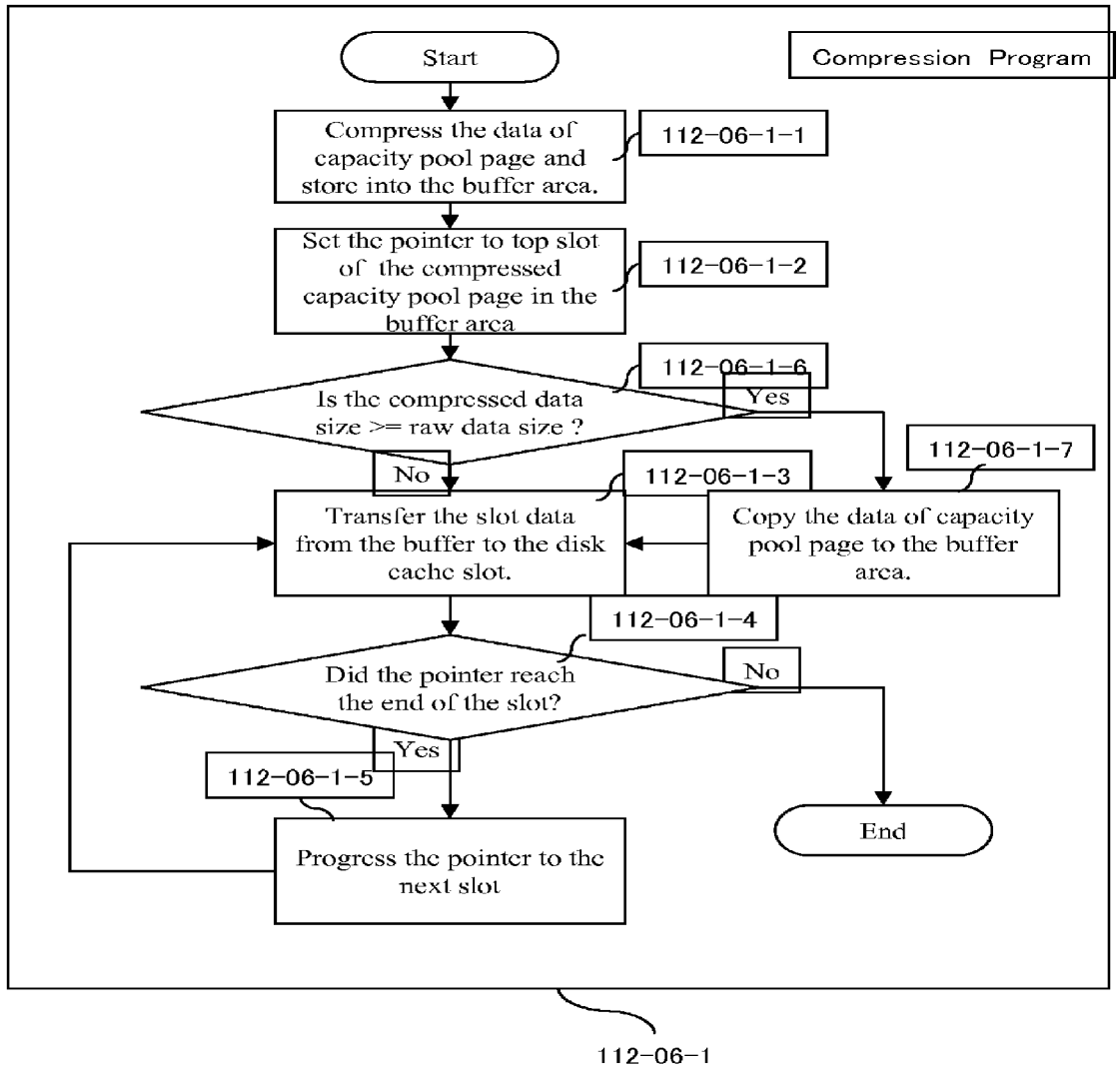
FIG. 33 illustrates an exemplary embodiment of an operational flow chart of the Compression Program.

FIG. 33 illustrates an exemplary embodiment of an operational flow chart of the Compression Program 112-06-1. Upon invocation, the Compression Program 112-06-1 is provided with a page for compression. The Compression Program 112-06-1 may include one or more of the following steps.

At Step 112-06-1-1, the CPU 111 reads the Cache Slots 112-20-1 of the page, compresses the page, and stores the compressed page in the Buffer Area 112-21. Additionally, the compressed page includes a compression management information, for example, compression dictionary information and check sum information. After that, the CPU 111 proceeds to Step 112-06-1-2.

At Step 112-06-1-2, the CPU 111 sets the pointer to a first slot number of the compressed page in the Buffer Area 112-21. After that, the CPU 111 proceeds to Step 112-06-1-6.

At Step 112-06-1-6, the CPU 111 compares the compressed data size and the virtual volume page size. If the size of the compressed data is equal or larger than the virtual volume size, then the CPU 111 proceeds to Step 112-06-1-7, otherwise the CPU 111 proceeds to Step 112-06-1-3.

At Step 112-06-1-7, the CPU 111 copies the source page data in the Cache Slots 112-20-1 and overwrites the Buffer Area 112-21. After that, the CPU 111 proceeds to Step 112-06-1-3.

At Step 112-06-1-3, the CPU 111 transfers the compressed slot from Buffer Area 112-21 to Cache Slot 112-20-1 of Capacity Pool Slot 121-3. After that, the CPU 111 proceeds to Step 112-06-1-4.

At Step 112-06-1-4, the CPU 111 determines whether the pointer has reached the last slot of the compressed page in the Buffer Area 112-21. If the pointer has reached the last slot, then the CPU 111 terminates the Compress Program 112-06-1. If the pointer has not reached the last slot, then the CPU 111 proceeds to Step 112-06-1-5.

At Step 112-06-1-5, the CPU 111 sets the pointer to the next slot. After that, the CPU 111 returns to Step 112-06-1-3.

Figure 34:
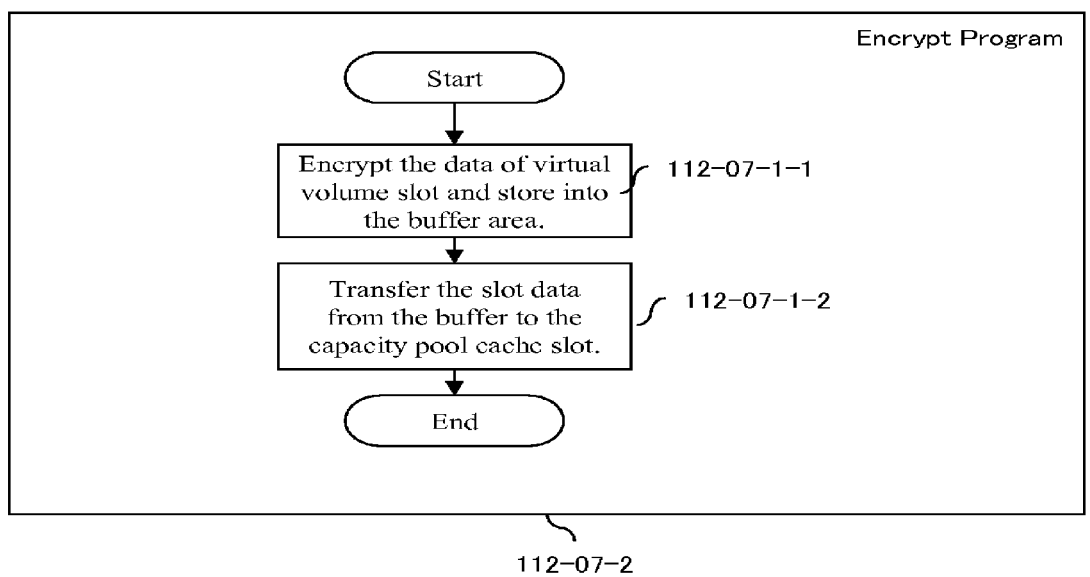
FIG. 34 illustrates an exemplary embodiment of an operational flow chart of the Encryption Program.

FIG. 34 illustrates an exemplary embodiment of a flow chart of the Encryption Program 112-07-1. Upon invocation, the Encryption Program 112-07-1 is provided with a slot for decryption. In one embodiment, the Encryption Program 112-07-1 includes one or more of the following steps.

At Step 112-07-1-1, the CPU 111 reads the Cache Slot 112-20-1 of the Virtual Volume Slot 140-2, encrypts the page, and stores the encrypted page in the Buffer Area 112-21. After that, the CPU 111 proceeds to Step 112-07-1-2.

At step 112-07-1-2 the CPU 111 copies the encrypted slot in Buffer Area 112-21 to the Cache Slots 112-20-1 of the Disk Slot 121-3. After that, the CPU 111 terminates the Decryption Program 112-07-1.

Figure 35:
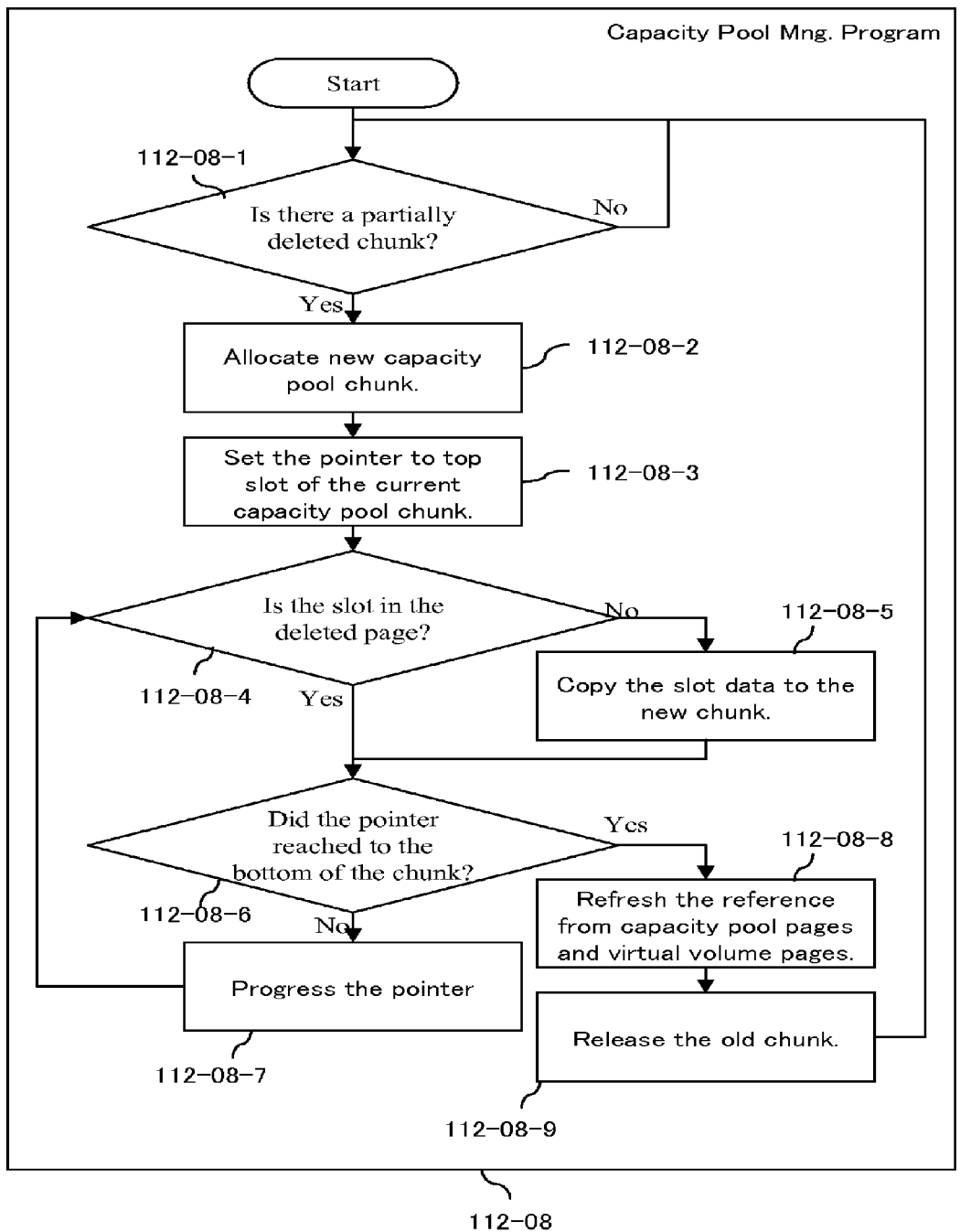
FIG. 35 illustrates an exemplary embodiment of an operational flow chart of the Capacity Pool Management Program.

FIG. 35 illustrates an exemplary embodiment of a flow chart of the Capacity Pool Management Program 112-08. The Capacity Pool Management Program 112-08 may include one or more of the following steps. At Step 112-08-1, the CPU 111 searches for the records of the Capacity Pool Chunk Management Table 112-16 that are linked to the "Used Chunk" queue indexed by Capacity Pool Element Management Table 112-15. The CPU 111 seeks the Deleted Capacity Information 112-16-04 and checks whether the respective value is more than 0, upon which the CPU 111 labels this chunk as "partially deleted chunk". If the CPU 111 finds the "partially deleted chunk", then the CPU 111 proceeds to Step 112-08-2. If the CPU 111 does not find the "partially deleted chunk" then the CPU 111 returns to Step 112-08-1.

At Step 112-08-2, the CPU 111 obtains the Capacity Pool Chunk Management Table 112-16 records that are linked to "Free Chunk" queue indexed by the Capacity Pool Element Management Table 112-15 to allocate new Capacity Pool Chunk 121-1. After that, the CPU 111 proceeds to Step 112-08-3.

At step 112-08-3, the CPU 111 sets the pointer A to first slot of the current allocated chunk and sets the pointer B to first slot of the newly allocated chunk. Thereafter, the CPU 111 proceeds to Step 112-08-4.

At Step 112-08-4, the CPU 111 determines whether or not the slot is in the deleted page of the chunk. To this end, the CPU 111 reads the Capacity Pool Page Management Table 112-17. After that, the CPU 111 calculates page offset by sum of Capacity Pool Page Size 112-17-1 and checks the parameter of Virtual Volume Page Number 112-17-02. If the parameter of Virtual Volume Page Number 112-17-02 is "NULL" then the CPU 111 proceeds to 112-08-6. If the parameter of Virtual Volume Page Number 112-17-02 is not "NULL" then the CPU 111 proceeds to step 112-08-5.

At Step 112-08-5, the CPU 111 copies the data from the slot indicated by the pointer A to the slot indicated by the pointer B. The CPU 111 sets the pointer B to point to the next slot of the newly allocated chunk. After that, the CPU 111 proceeds to Step 112-08-6.

At Step 112-08-6, the CPU 111 checks the pointer A. If the pointer A has reached to the last slot of the current chunk, then the CPU 111 proceeds to Step 112-08-8. If pointer A has not reached to last slot of the current chunk, then the CPU 111 proceeds to Step 112-08-7.

At Step 112-08-7, the CPU 111 sets the pointer A to the next slot of the current chunk. After that, the CPU 111 returns to Step 112-08-4.

At Step 112-08-8, the CPU 111 changes the Virtual Volume Page 140-1 addresses to the slots data copied from the Capacity Pool Page Management Table 112-17. The CPU 111 also changes Virtual Volume Page Management table to newly copied Capacity Pool Page 121-1 addresses and sizes. After that, the CPU 111 proceeds to Step 112-08-9.

Finally, at Step 112-08-9, the CPU 111 sets the current chunk to "Free Chunk" queue indexed by the Capacity Pool Element Management Table 112-15 to allocate new Capacity Pool Chunk 121-1. After that, the CPU 111 returns to Step 112-08-1.

Exemplary Computer Platform

Figure 36:
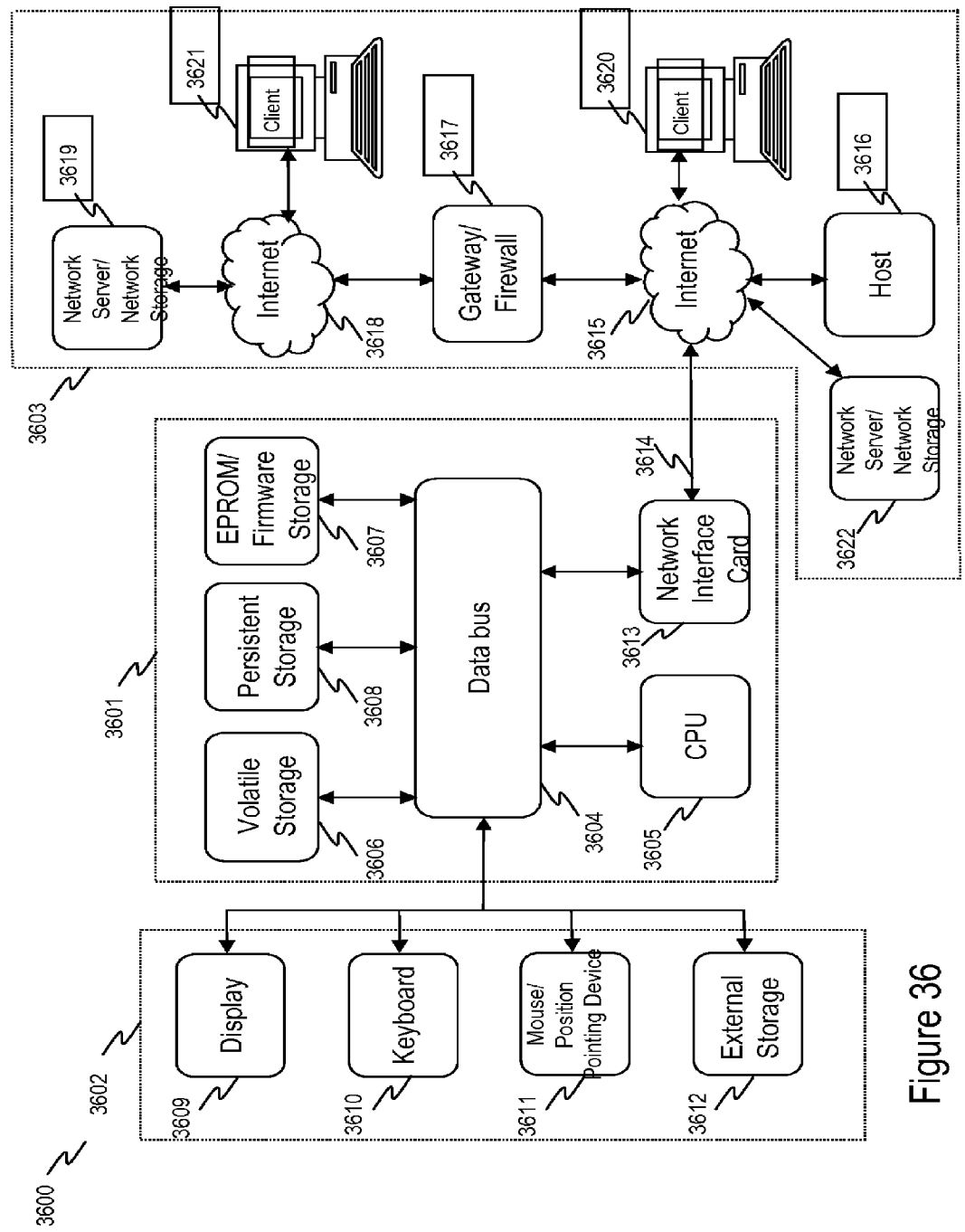
FIG. 36 illustrates an exemplary embodiment of a computer platform upon which the inventive system may be implemented.

FIG. 36 is a block diagram that illustrates an embodiment of a computer/server system 3600 upon which an embodiment of the inventive methodology may be implemented. The system 3600 includes a computer/server platform 3601, peripheral devices 3602 and network resources 3603.

The computer platform 3601 may include a data bus 3604 or other communication mechanism for communicating information across and among various parts of the computer platform 3601, and a processor 3605 coupled with bus 3601 for processing information and performing other computational and control tasks. Computer platform 3601 also includes a volatile storage 3606, such as a random access memory (RAM) or other dynamic storage device, coupled to bus 3604 for storing various information as well as instructions to be executed by processor 3605. The volatile storage 3606 also may be used for storing temporary variables or other intermediate information during execution of instructions by processor 3605. Computer platform 3601 may further include a read only memory (ROM or EPROM) 3607 or other static storage device coupled to bus 3604 for storing static information and instructions for processor 3605, such as basic input-output system (BIOS), as well as various system configuration parameters. A persistent storage device 3608, such as a magnetic disk, optical disk, or solid-state flash memory device is provided and coupled to bus 3601 for storing information and instructions.

Computer platform 3601 may be coupled via bus 3604 to a display 3609, such as a cathode ray tube (CRT), plasma display, or a liquid crystal display (LCD), for displaying information to a system administrator or user of the computer platform 3601. An input device 3610, including alphanumeric and other keys, is coupled to bus 3601 for communicating information and command selections to processor 3605. Another type of user input device is cursor control device 3611, such as a mouse, a trackball, or cursor direction keys for communicating direction information and command selections to processor 3604 and for controlling cursor movement on display 3609. This input device typically has two degrees of freedom in two axes, a first axis (e.g., x) and a second axis (e.g., y), that allows the device to specify positions in a plane.

An external storage device 3612 may be connected to the computer platform 3601 via bus 3604 to provide an extra or removable storage capacity for the computer platform 3601. In an embodiment of the computer system 3600, the external removable storage device 3612 may be used to facilitate exchange of data with other computer systems.

The invention is related to the use of computer system 3600 for implementing the techniques described herein. In an embodiment, the inventive system may reside on a machine such as computer platform 3601. According to one embodiment of the invention, the techniques described herein are performed by computer system 3600 in response to processor 3605 executing one or more sequences of one or more instructions contained in the volatile memory 3606. Such instructions may be read into volatile memory 3606 from another computer-readable medium, such as persistent storage device 3608. Execution of the sequences of instructions contained in the volatile memory 3606 causes processor 3605 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3605 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 3608. Volatile media includes dynamic memory, such as volatile storage 3606. Transmission media includes coaxial cables, copper wire and fiber optics, including the wires that comprise data bus 3604. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 3605 for execution. For example, the instructions may initially be carried on a magnetic disk from a remote computer. Alternatively, a remote computer can load the instructions into its dynamic memory and send the instructions over a telephone line using a modem. A modem local to computer system 3600 can receive the data on the telephone line and use an infra-red transmitter to convert the data to an infra-red signal. An infra-red detector can receive the data carried in the infra-red signal and appropriate circuitry can place the data on the data bus 3604. The bus 3604 carries the data to the volatile storage 3606, from which processor 3605 retrieves and executes the instructions. The instructions received by the volatile memory 3606 may optionally be stored on persistent storage device 3608 either before or after execution by processor 3605. The instructions may also be downloaded into the computer platform 3601 via Internet using a variety of network data communication protocols well known in the art.

The computer platform 3601 also includes a communication interface, such as network interface card 3613 coupled to the data bus 3604. Communication interface 3613 provides a two-way data communication coupling to a network link 3614 that is connected to a local network 3615. For example, communication interface 3613 may be an integrated services digital network (ISDN) card or a modem to provide a data communication connection to a corresponding type of telephone line. As another example, communication interface 3613 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 3613 sends and receives electrical, electromagnetic or optical signals that carry digital data streams representing various types of information.

Network link 3613 typically provides data communication through one or more networks to other network resources. For example, network link 3614 may provide a connection through local network 3615 to a host computer 3616, or a network storage/server 3617. Additionally or alternatively, the network link 3613 may connect through gateway/firewall 3617 to the wide-area or global network 3618, such as an Internet. Thus, the computer platform 3601 can access network resources located anywhere on the Internet 3618, such as a remote network storage/server 3619. On the other hand, the computer platform 3601 may also be accessed by clients located anywhere on the local area network 3615 and/or the Internet 3618. The network clients 3620 and 3621 may themselves be implemented based on the computer platform similar to the platform 3601.

Local network 3615 and the Internet 3618 both use electrical, electromagnetic or optical signals that carry digital data streams. The signals through the various networks and the signals on network link 3614 and through communication interface 3613, which carry the digital data to and from computer platform 3601, are exemplary forms of carrier waves transporting the information.

Computer platform 3601 can send messages and receive data, including program code, through the variety of network(s) including Internet 3618 and LAN 3615, network link 3614 and communication interface 3613. In the Internet example, when the system 3601 acts as a network server, it might transmit a requested code or data for an application program running on client(s) 3620 and/or 3621 through Internet 3618, gateway/firewall 3617, local area network 3615 and communication interface 3613. Similarly, it may receive code from other network resources.

The received code may be executed by processor 3605 as it is received, and/or stored in persistent or volatile storage devices 3608 and 3606, respectively, or other non-volatile storage for later execution. In this manner, computer system 3601 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with thin provisioning and compression functionality. It is intended that the specification and examples be considered as exemplary only, with a true scope and spirit of the invention being indicated by the following claims.

What is claimed is:

1. A storage system comprising:
a plurality of storage devices on which a storage pool having a plurality of storage regions is configured; and
a storage controller configured to manage a virtual volume, which has a first attribute indicating that a compression function is not enabled for the virtual volume, the virtual volume having a plurality of virtual storage areas, the virtual storage areas including a first virtual storage area to which one or more first storage regions in the storage pool are allocated,
wherein, if the first attribute of the virtual volume is changed to a second attribute indicating that the compression function is enabled for the virtual volume, the storage controller is further configured to:
compress data read from the one or more first storage regions which are allocated to the first virtual storage area in the virtual volume;
correlate one or more second storage regions to the first virtual storage area to store the compressed data, the number of the one or more second storage regions being less than the number of the one or more first storage regions; and
free the one or more first storage regions from allocation to the first virtual storage area.

2. A storage system according to claim 1,
wherein the storage controller is further configured to:
determine whether the data is to be stored in the compressed form, and
correlate the one or more second storage regions to the first virtual storage area to store the compressed data if the storage controller determines the data is to be stored in the compressed form.

3. A storage system according to claim 1,
wherein the storage controller is further configured to:
determine whether another data, which is read from one or more third storage regions allocated to a second virtual storage area in the virtual volume stored, is to be stored in compressed form, and
maintain allocation of the one or more third storage regions to the second virtual storage area in the virtual volume if the storage controller determines the another data is not to be stored in the compressed form.

4. A storage system according to claim 1,
wherein the plurality of storage regions in the storage pool are fixed length storage regions.

5. A storage system according to claim 1,
wherein the storage controller includes a cache memory, and is further configured to compress the data read from the one or more first storage areas on the cache memory.

6. A storage system according to claim 2,
wherein the storage controller is further configured to check a size of the compressed form of the data to determine whether the data is to be stored in the compressed form.

7. A storage system according to claim 2, wherein the storage controller is further configured to compare a size of the compressed form of the data and the size of the first virtual area to decide whether to store the data in the compressed form.

8. A storage system according to claim 2, wherein the storage controller is further configured to compare a size of the compressed form of the data and a size of an uncompressed form of the data to decide whether to store the data in the compressed form.

9. A storage system according to claim 1, wherein the storage controller, in response to receiving a read request for the compressed data stored in the one or more second storage regions allocated to the first virtual storage area, is further configured to:
read the compressed data from the one or more second storage regions allocated to the first virtual storage area;
decompress the compressed data as decompressed data; and
transfer the decompressed data as a response to the read request.

10. In a storage system having a plurality of storage devices on which a storage pool having a plurality of storage regions is configured and a storage controller, the method comprising the steps of:

managing a virtual volume, which has a first attribute indicating that a compression function is not enabled for the virtual volume, the virtual volume having a plurality of virtual storage areas, the virtual storage areas including a first virtual storage area to which one or more first storage regions in the storage pool are allocated, if the first attribute of the virtual volume is changed to a second attribute indicating that the compression function is enabled for the virtual volume, the storage controller performing the steps of:

compressing data read from the one or more first storage regions which are allocated to the first virtual storage area in the virtual volume;

correlating one or more second storage regions to the first virtual storage area to store the compressed data, the number of the one or more second storage regions being less than the number of the one or more first storage regions; and freeing the one or more first storage regions from allocation to the first virtual storage area.

11. A method according to claim 10,
wherein the storage controller further performs the steps of:
determining whether the data is to be stored in the compressed form, and
correlating the one or more second storage regions to the first virtual storage area to store the compressed data if the storage controller determines the data is to be stored in the compressed form.

12. A method according to claim 10,
wherein the storage controller further performs the steps of:
determining whether another data, which is read from one or more third storage regions allocated to a second virtual storage area in the virtual volume stored, is to be stored in compressed form, and
maintaining allocation of the one or more third storage regions to the second virtual storage area in the virtual volume if the storage controller determines the another data is not to be stored in the compressed form.

13. A method according to claim 10,
wherein the plurality of storage regions in the storage pool are fixed length storage regions.

14. A method according to claim 10,
wherein the storage controller includes a cache memory, and further performs the step of compressing the data read from the one or more first storage areas on the cache memory.

15. A method according to claim 11,
wherein the storage controller further performs the step of checking a size of the compressed form of the data to determine whether the data is to be stored in the compressed form.

16. A method according to claim 11, wherein the storage controller further performs the step of comparing a size of the compressed form of the data and the size of the first virtual area to decide whether to store the data in the compressed form.

17. A method according to claim 11, wherein the storage controller further performs the step of comparing a size of the compressed form of the data and a size of an uncompressed form of the data to decide whether to store the data in the compressed form.

18. A method according to claim 10, wherein the storage controller, in response to receiving a read request for the compressed data stored in the one or more second storage regions allocated to the first virtual storage area, further performs the steps of:

reading the compressed data from the one or more second storage regions allocated to the first virtual storage area;
decompressing the compressed data as decompressed data; and
transferring the decompressed data as a response to the read request.

* * * * *